Dec. 10, 1935.　　　　F. J. SPRAGUE　　　　2,024,074
UNIVERSAL ELECTRIC SIGN SYSTEM
Original Filed Nov. 19, 1929　　11 Sheets-Sheet 1
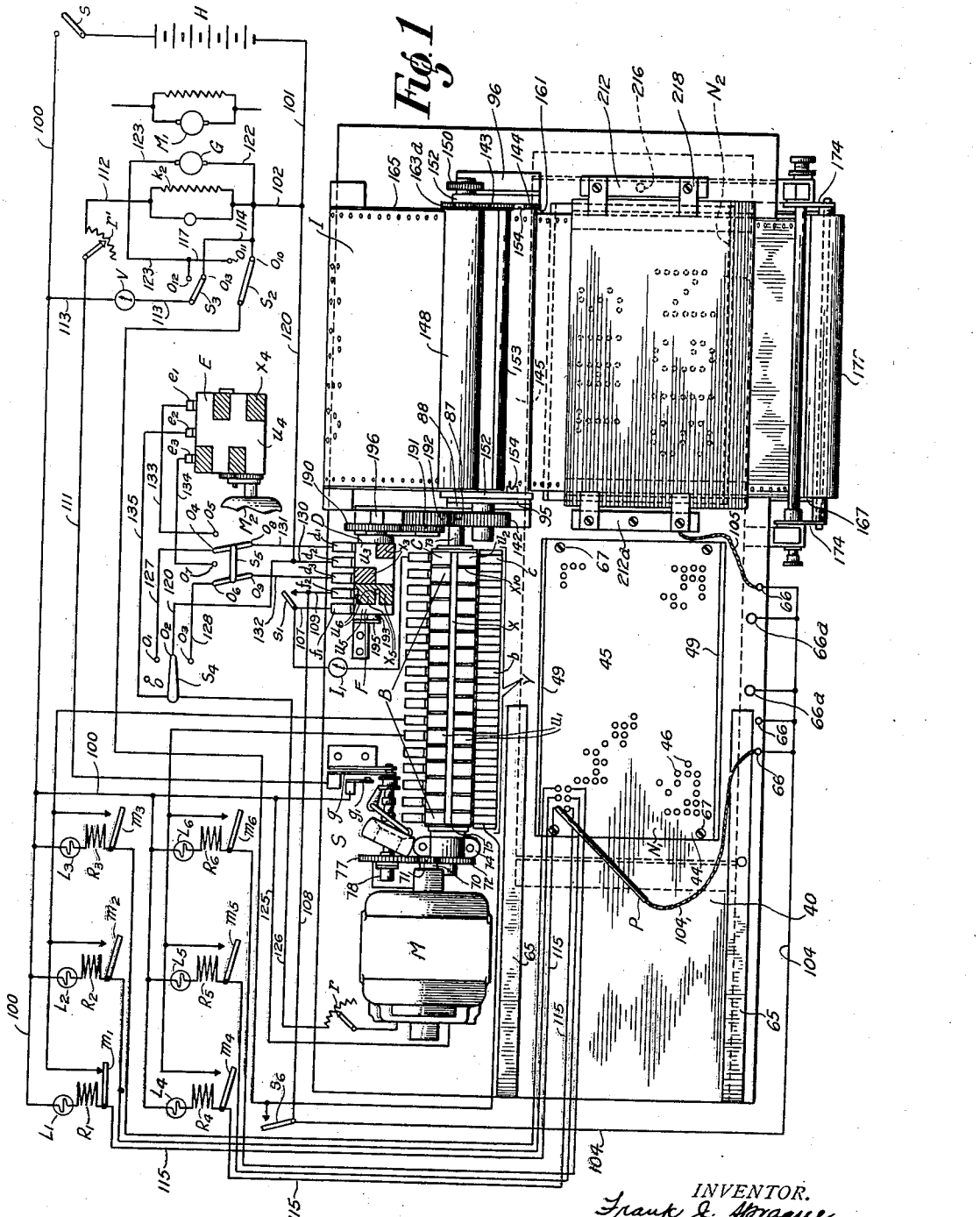
INVENTOR.
Frank J. Sprague
BY Dorsey & Cole
ATTORNEYS.

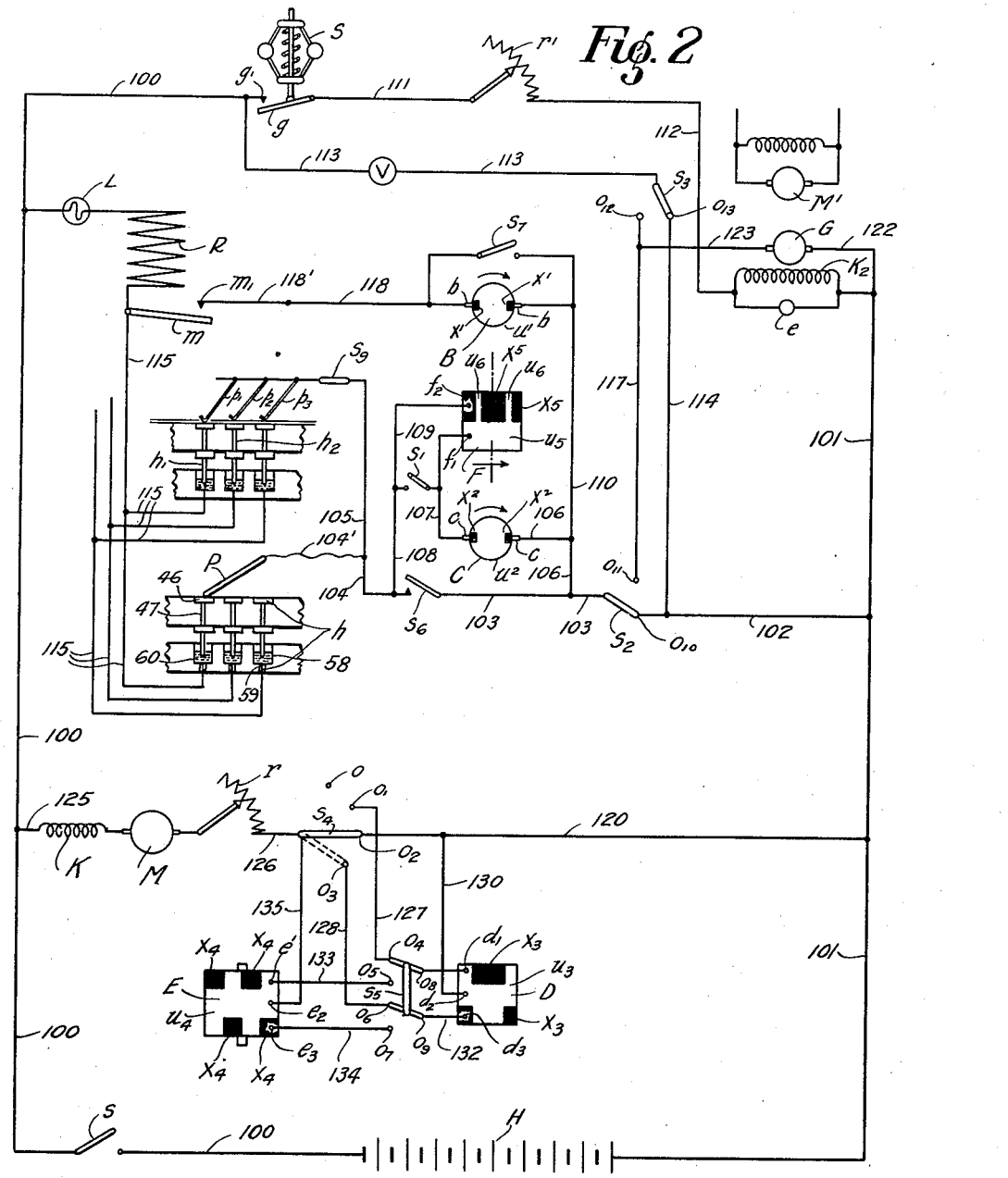

Dec. 10, 1935.    F. J. SPRAGUE    2,024,074
UNIVERSAL ELECTRIC SIGN SYSTEM
Original Filed Nov. 19, 1929    11 Sheets-Sheet 3
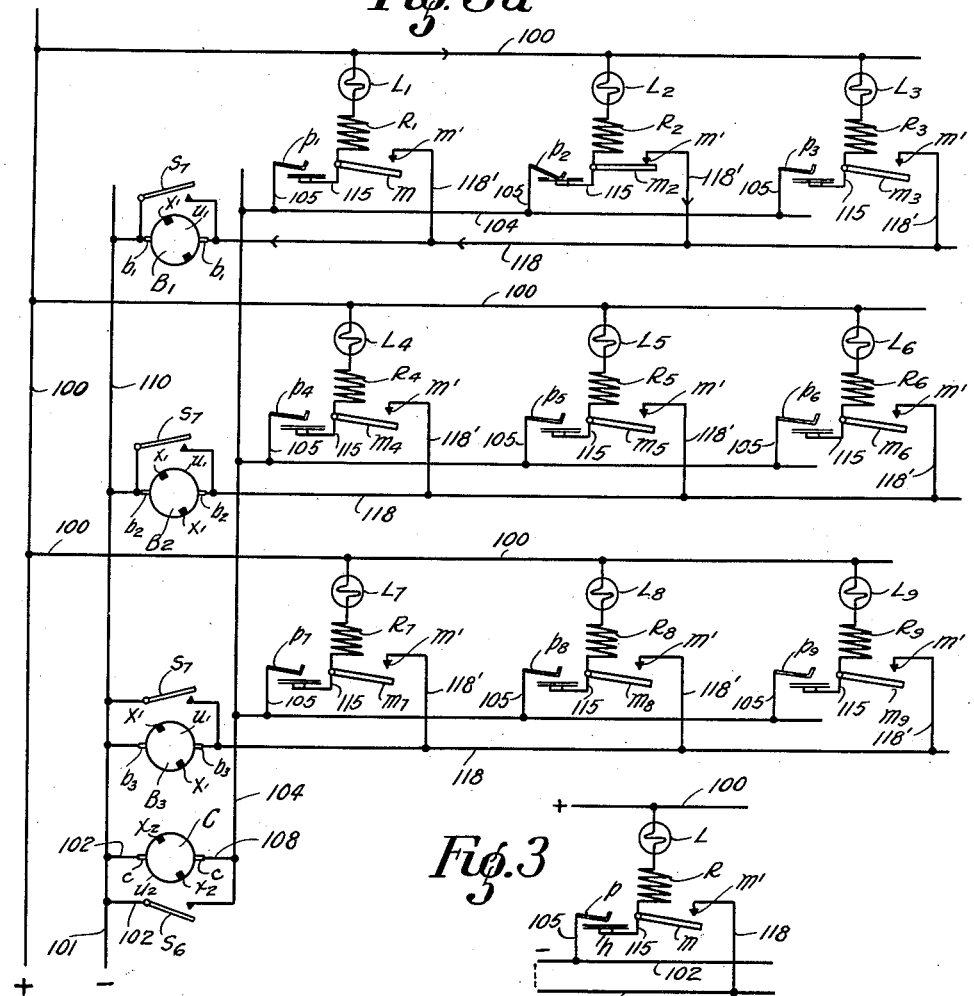
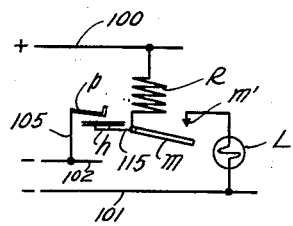
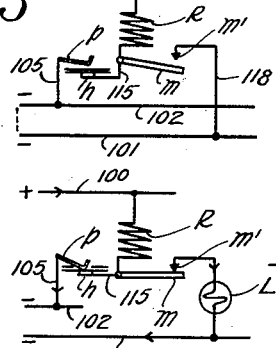
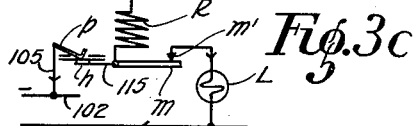
INVENTOR.
Frank J. Sprague
BY Dorsey & Cole
ATTORNEYS.

Dec. 10, 1935.　　　F. J. SPRAGUE　　　2,024,074
UNIVERSAL ELECTRIC SIGN SYSTEM
Original Filed Nov. 19, 1929　　11 Sheets-Sheet 4

INVENTOR.
Frank J. Sprague
BY Dorsey & Cole
ATTORNEY.

Dec. 10, 1935.  F. J. SPRAGUE  2,024,074
UNIVERSAL ELECTRIC SIGN SYSTEM
Original Filed Nov. 19, 1929   11 Sheets-Sheet 5
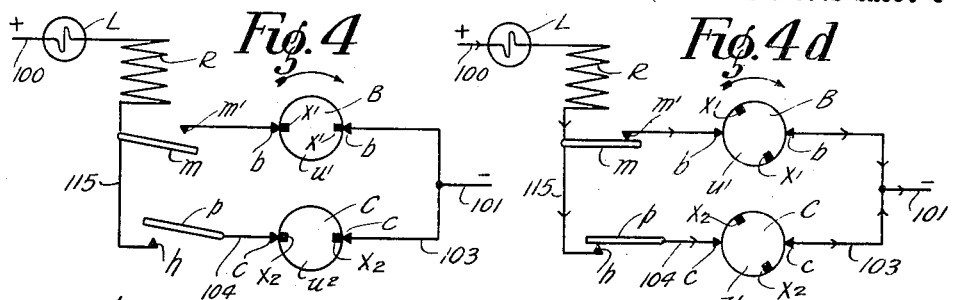
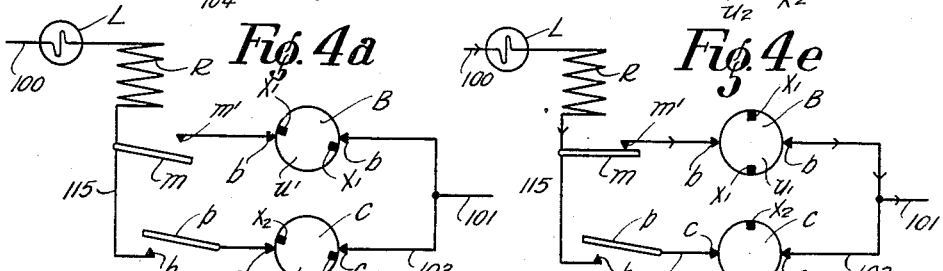
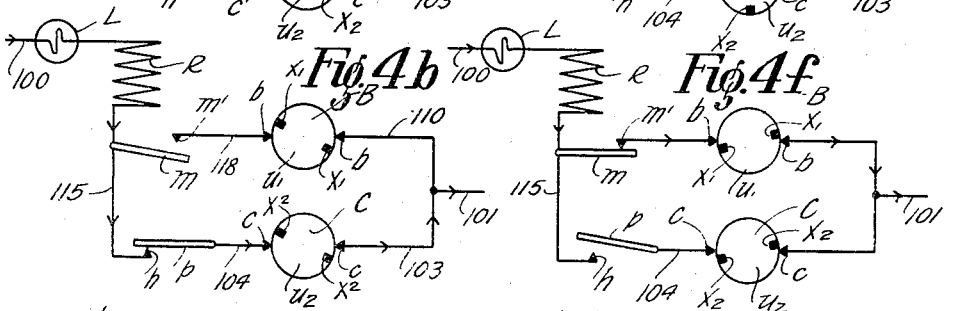
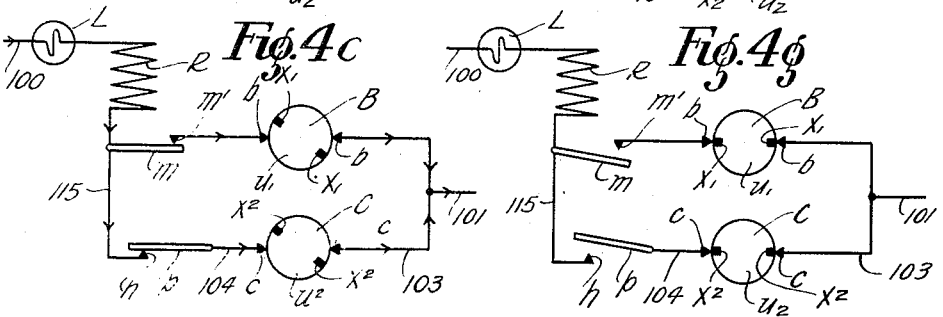
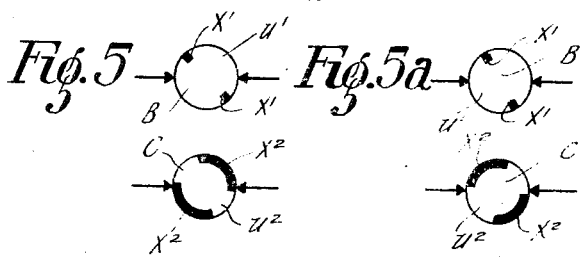
Frank J. Sprague
INVENTOR.
BY Dorsey Cole
ATTORNEYS.

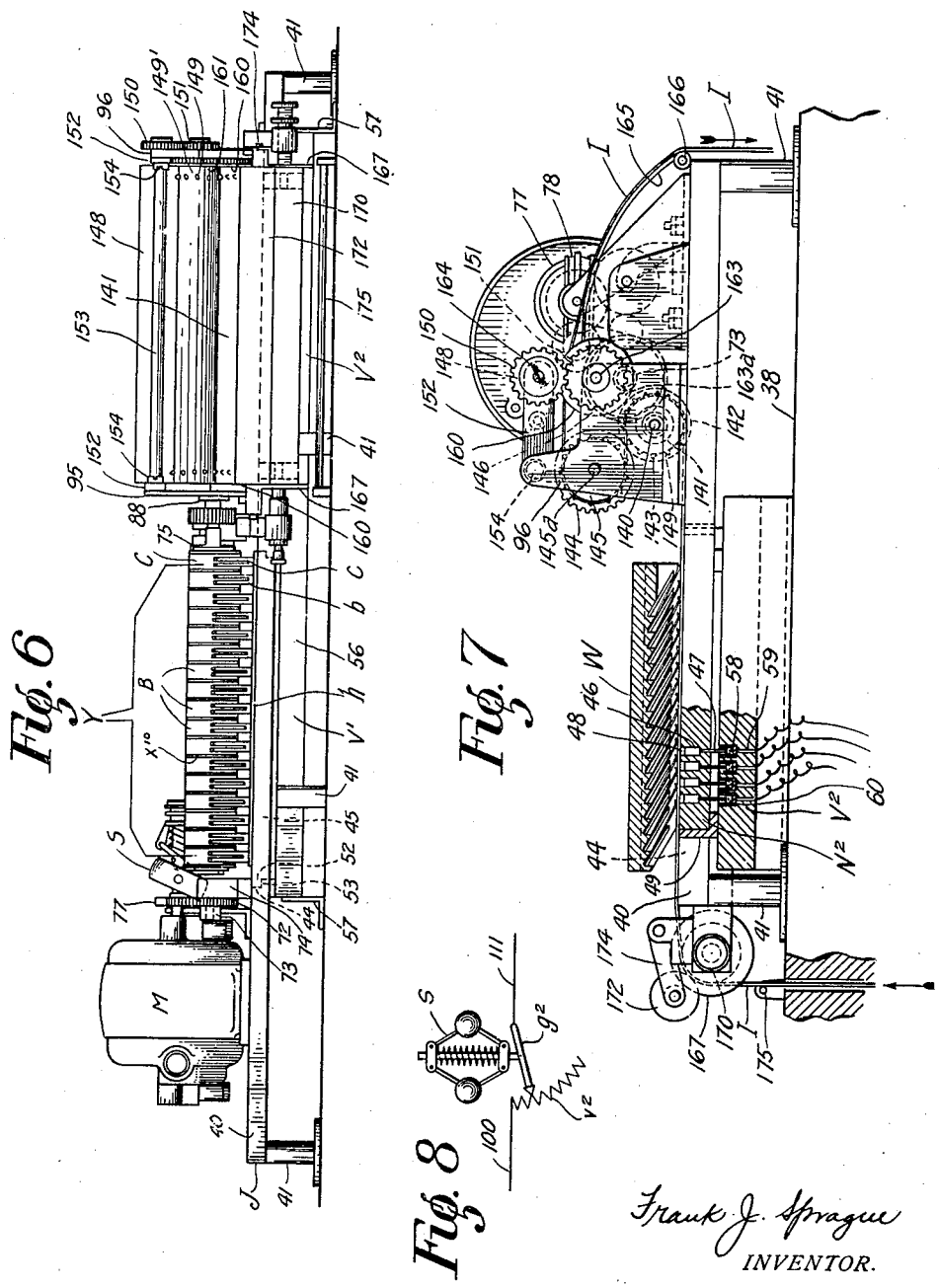

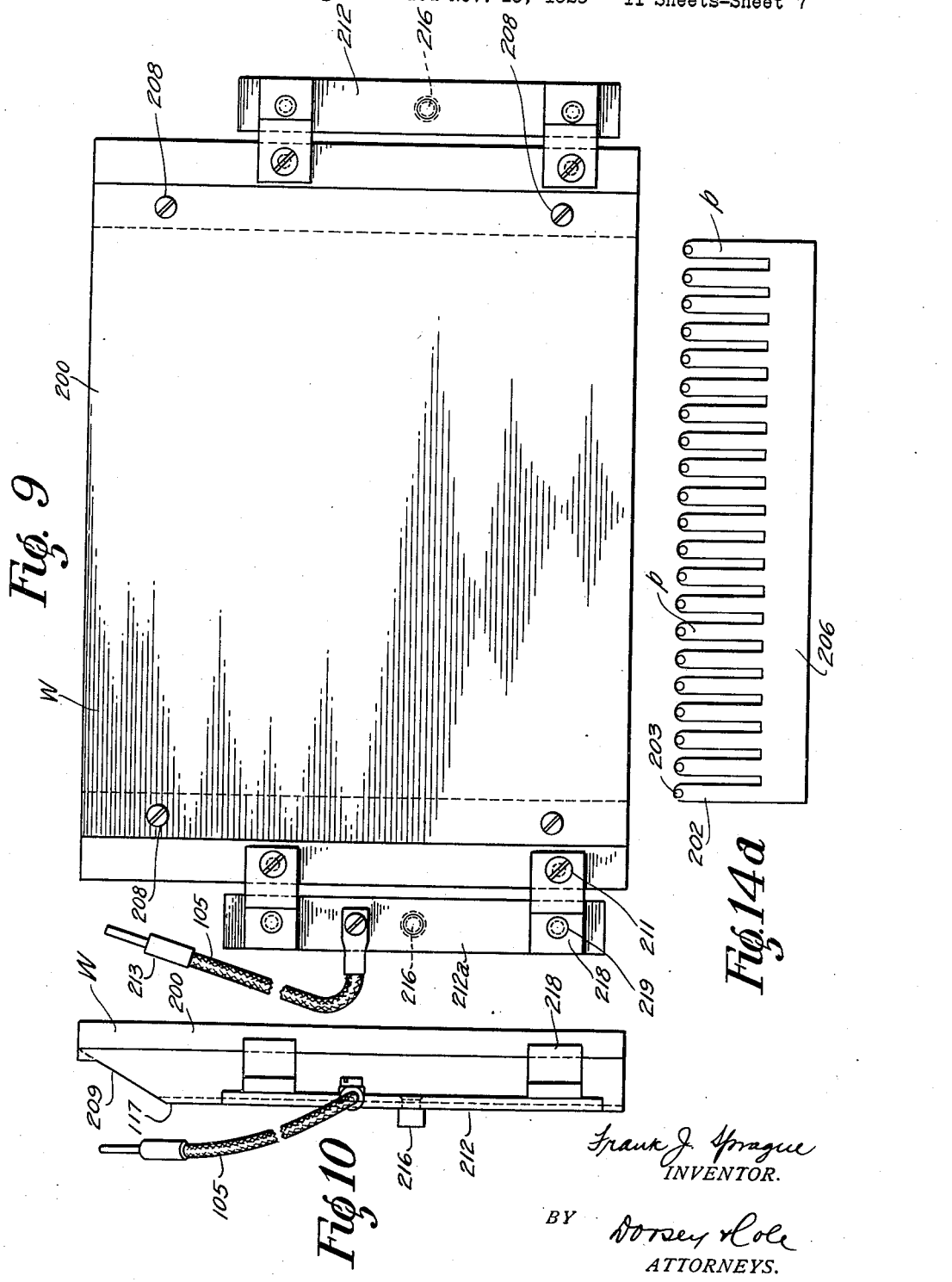

Dec. 10, 1935.                F. J. SPRAGUE                2,024,074
                       UNIVERSAL ELECTRIC SIGN SYSTEM
                   Original Filed Nov. 19, 1929    11 Sheets-Sheet 8
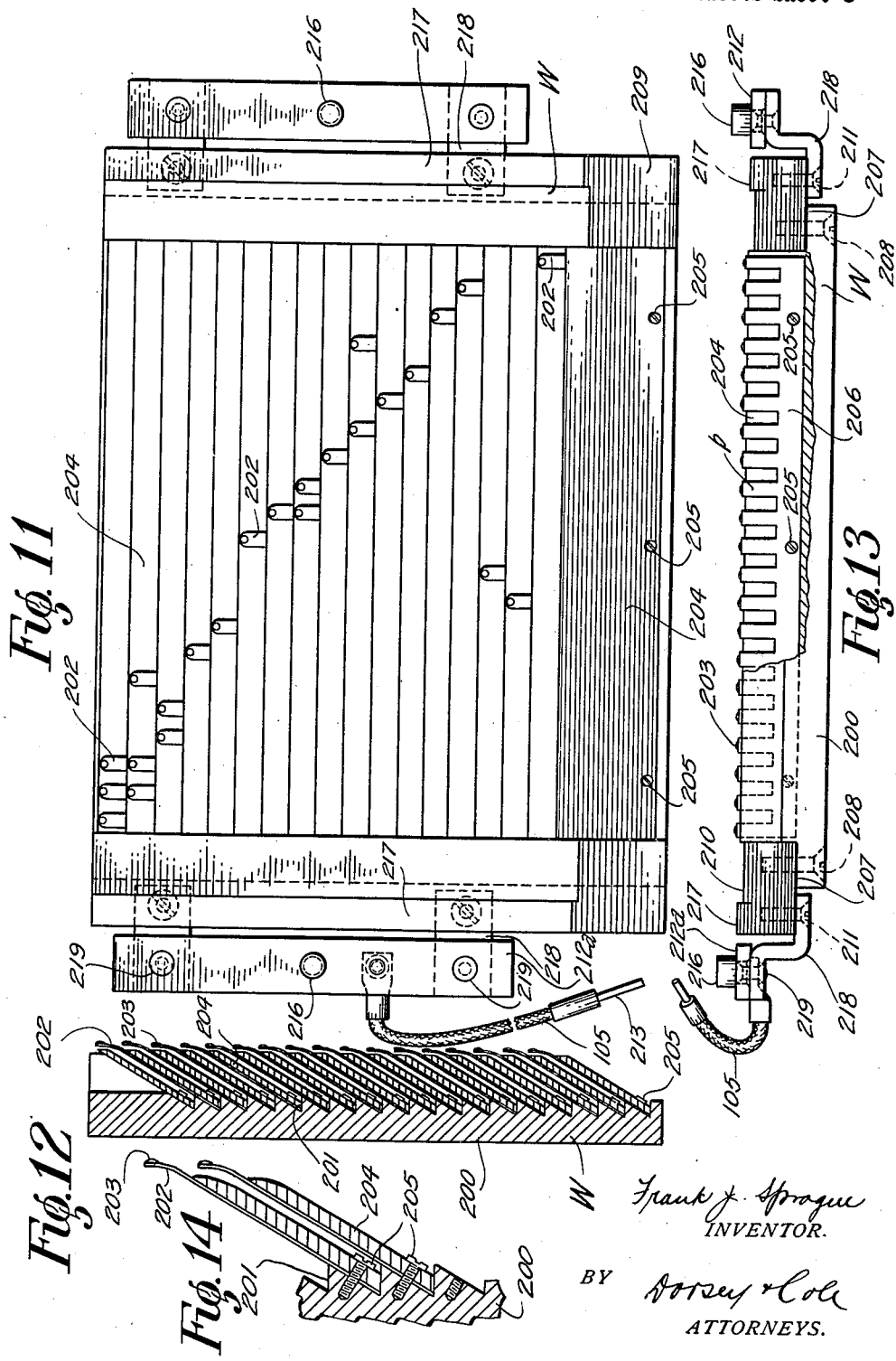
Frank J. Sprague
INVENTOR.
BY Dorsey & Cole
ATTORNEYS.

Dec. 10, 1935. F. J. SPRAGUE 2,024,074
UNIVERSAL ELECTRIC SIGN SYSTEM
Original Filed Nov. 19, 1929 11 Sheets-Sheet 9
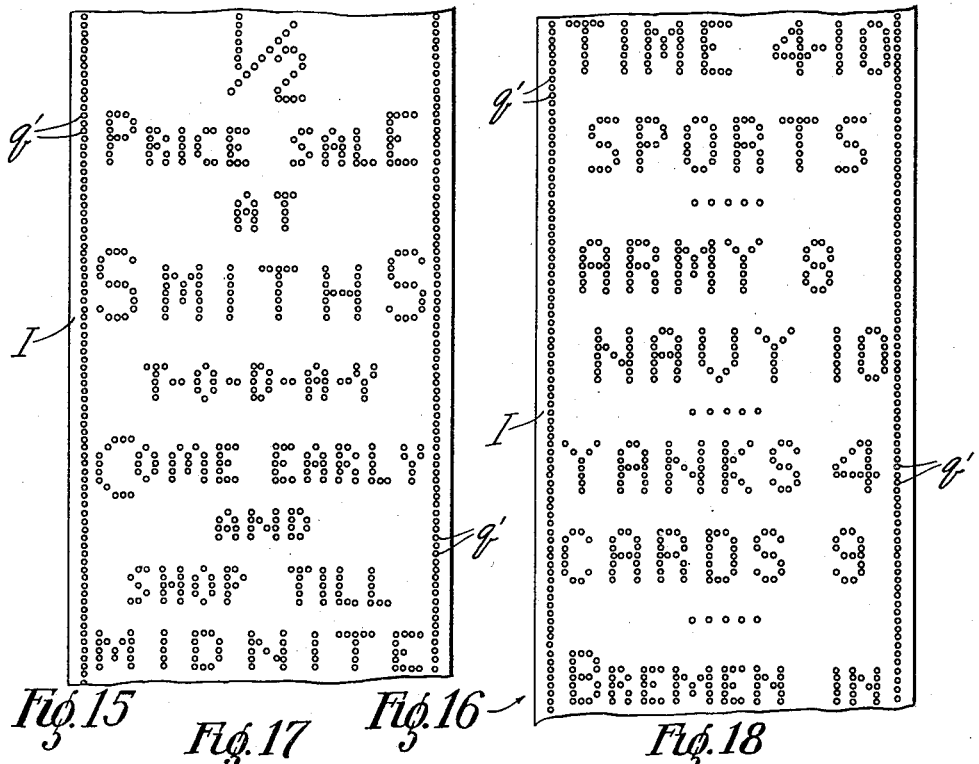
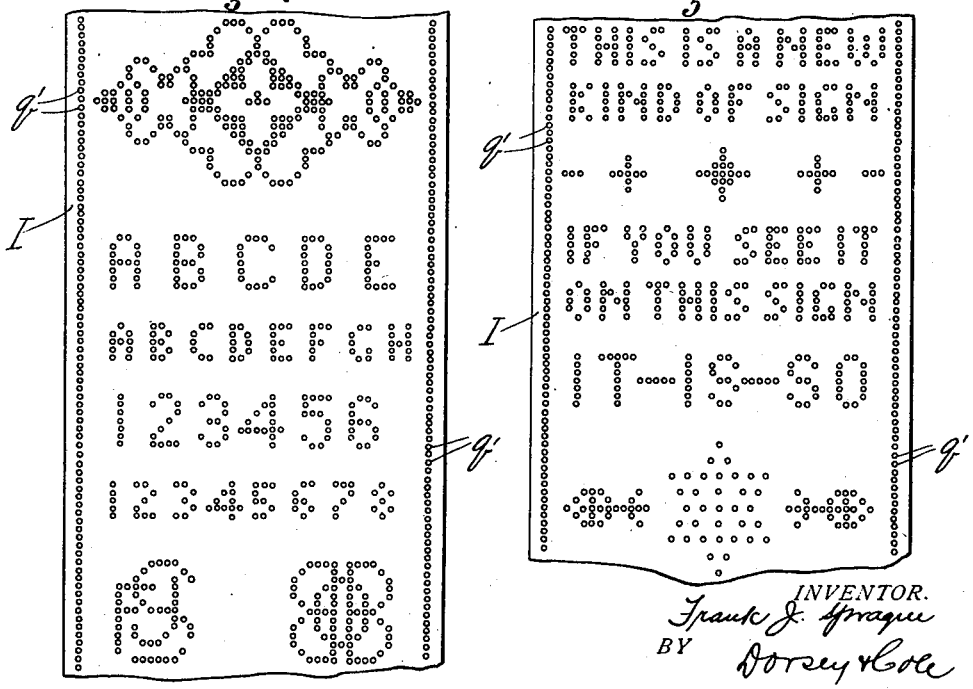
INVENTOR.
Frank J. Sprague
BY Dorsey & Cole
ATTORNEYS.

Dec. 10, 1935.   F. J. SPRAGUE   2,024,074
UNIVERSAL ELECTRIC SIGN SYSTEM
Original Filed Nov. 19, 1929   11 Sheets-Sheet 10

Frank J. Sprague
INVENTOR.
BY Dorsey & Cole
ATTORNEYS.

Dec. 10, 1935.  F. J. SPRAGUE  2,024,074
UNIVERSAL ELECTRIC SIGN SYSTEM
Original Filed Nov. 19, 1929  11 Sheets—Sheet 11
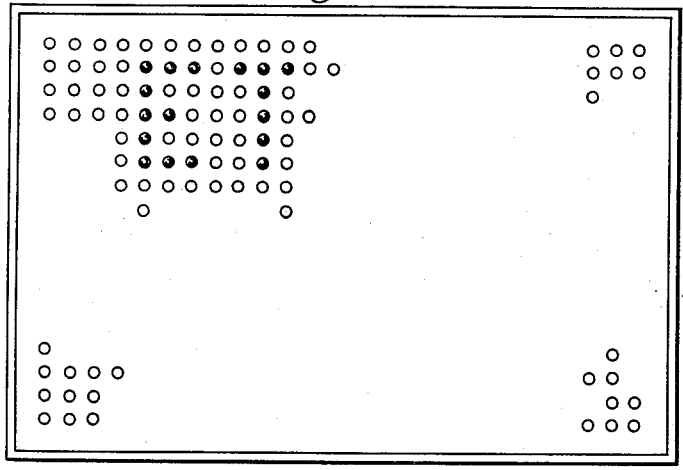
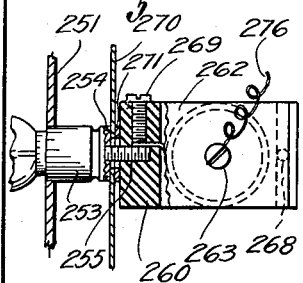
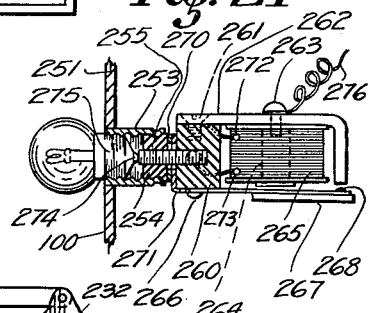
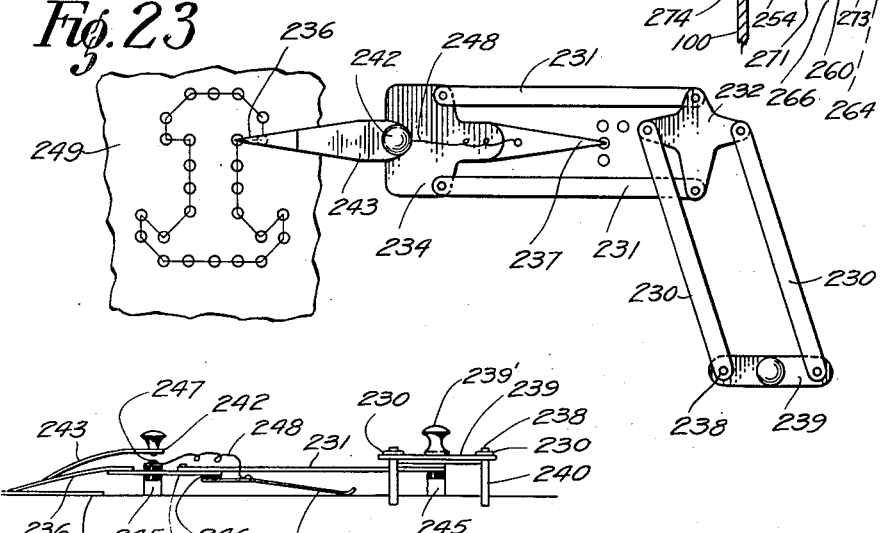
Frank J. Sprague
INVENTOR.
BY Dorsey & Cole
ATTORNEYS.

Patented Dec. 10, 1935

2,024,074

UNITED STATES PATENT OFFICE 2,024,074

UNIVERSAL ELECTRIC SIGN SYSTEM

Frank J. Sprague, New York, N. Y., assignor to Sprague Signs, Inc., Wilmington, Del., a corporation of Delaware Original application November 19, 1929, Serial No. 408,347, now Patent No. 1,835,912, dated December 8, 1931. Divided and this application September 23, 1931, Serial No. 564,657

16 Claims. (Cl. 177—350)

This invention relates to electric signs, and one of the principal objects thereof is to provide an electric sign system of universal character, in which massed electric lamps are utilized with means adapted to display on the lamp mass signs of great variety. For instance, facsimile reproductions, script, silhouettes or the like may be displayed, together with prearranged display in word and sentence form, and the display may be still or moving, may proceed in any direction, and at various rates of speed, and the different displays may follow each other in slow or rapid succession, and in any desired sequence, and all or a part of the lamps may be used for the different displays.

This application is a division of my co-pending application Serial No. 408,347, filed November 19, 1929, now Patent No. 1,835,912, dated Dec. 8, 1931 and an object of the invention is to provide a sign system in which the display may proceed progressively, or step by step, or intermittently, and in which the various kinds of display may be obtained without any alteration or change in the construction of the parts, and in which the character of display can be instantly changed from one to the other.

A further object of the invention is to provide a sign system in which a prearranged and improvised display may be simultaneously shown, or may be alternated or combined.

A still further object of my invention is to provide for a display of multiple words and sentences which are brought into visibility and progressed vertically in linotype fashion in a novel arrangement, whereby I obtain an increase in the amount of information displayed by moving sign letters without increasing the speed of light change required in present day moving letter displays, and at the same time am enabled to use standard lamps, and to obtain a uniform use thereof.

A still further object of the invention is to provide means whereby multiple words and sentences, or designs may be displayed as still exhibits, or continuously or in stepped or intermittent movement, with automatic control, or under manual control, or both.

Another object of the invention is to provide for the display and the control of one or more independently operating silhouettes of fixed shape or articulated form, and also for the control of the display by means of a novel pantograph construction.

Another object is to provide for a plurality of master platens for operation in connection with independent or combined display, and to provide novel construction and means of mounting the same.

A still further object of my invention is to vary the intensity of the lamps without the use of resistances, produce a desired degree of illumination, and to also maintain the selected intensity of the lamps constant, irrespective of the speed of progressive sign display or the speed in changing from moving to still display and vice versa.

Further objects of the invention will become apparent as the description proceeds.

In the accompanying drawings which illustrate an embodiment of my sign system:

Fig. 1 is partly a top view, partly a diagrammatic representation, of an apparatus illustrating my invention, also showing the electric circuit arrangement therefor.

Fig. 2 is a diagrammatic representation of the apparatus and circuits of Fig. 1.

Fig. 3 is a diagram showing, for a single lamp, the controlling circuits in a simplified arrangement.

Fig. 3a is a diagram showing, for a plurality of lamps, a controlling circuit arrangement similar to that of Fig. 3, also embodying additional controlling means.

Figs. 3b and 3c are diagrams showing, for a single lamp, an alternative circuit arrangement whereby in Fig. 3b the relay is deenergized, and in Fig. 3c the relay R is energized.

Figs. 4 and 4a to 4g, are diagrams showing at successive intervals the condition of the controlling circuits of a single lamp when it participates in a moving display.

Figs. 5 and 5a are diagrammatic illustrations of a modified form of the circuit-breaker of the initiating circuit which permits variation of the lamp intensity without the use of rheostats.

Fig. 6 is a front elevation of the sign control apparatus of Fig. 1 showing the record-driving mechanism, the circuit-breakers of the maintaining and initiating circuits, and the driving motor.

Fig. 7 is a side elevation, partially in section, of part of the control mechanism of Fig. 1, showing the contacting and driving mechanism for the display of moving signs from a perforated record.

Fig. 8 is a diagram of a speed controlled rheostat to maintain the selected brilliancy of the lamp irrespective of the speed of progress of the display.

Fig. 9 is a top view of the upper contact block used with moving sign records.

Fig. 10 is a side view of Fig. 9.

Fig. 11 is a bottom view of Fig. 9.

Fig. 12 is a cross-section of Fig. 11, along lines 12—12.

Fig. 13 is a front view of Fig. 11, with parts broken away.

Fig. 14 is an enlarged detail of the tong contacts of Fig. 12.

Fig. 14a is a side view of one of the tong strips.

Figs. 15 to 18 are typical illustrations of perforated records.

Fig. 20 is a schematic front of the display board showing part of the lamp bank.

Fig. 21 is an enlarged section through one of the lamp units of the display board showing the unitary construction of the lamp socket and relay.

Fig. 21a is a plan view of Fig. 21 partially in section.

Fig. 22 is a fragmentary view of the bus bar electrically interconnecting the armatures of the relays in one horizontal row.

Fig. 23 is a plan view of the pantograph construction showing its relationship to one of the contact platens.

Fig. 24 is an edge view of the pantograph.

Figure 3D:
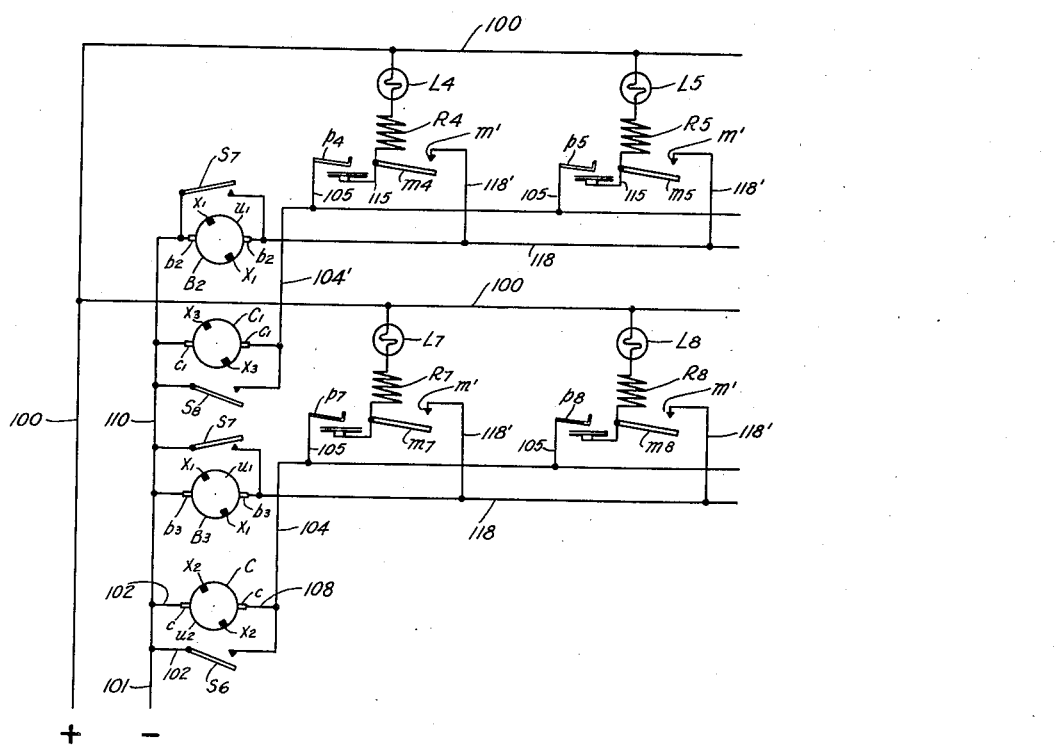
Fig. 3d is a diagram similar to Fig. 3a and showing a plurality of initiating circuit-breakers.

Referring to the drawings and, more particularly to Fig. 1, the apparatus for my sign system consists in its main parts of a display board carrying massed electric lamps and of control means for lighting and blanking of the lamps. The lamps of, for instance, the top row, illustrated diagrammatically, are designated L—1, L—2 and L—3 and those of the next lower row are designated L—4, L—5 and L—6. It is to be understood, of course, that there are in practice a great many more lamps in each row, three only being used for illustrating purposes. Many thousands of lamps would be used, for instance, in an installation for outdoor advertising purposes.

The lamps L—1, L—2, etc. are disposed on the display board symmetrically in vertical and horizontal lines and in close proximity to each other. The board or panel may be any suitable supporting structure, as, for instance, a steel frame.

Relays R—1, R—2, etc. are provided one for each lamp and with exception of these relays which I prefer to locate on or near the display panel, the controlling means are preferably mounted on a common control panel J. This control panel J is easily accessible for an operator; and in case of outdoor advertising it would be preferably located at a considerable distance from the lamp board in a convenient control booth.

Fig. 3 illustrates in its simplest form the circuits and controlling means for a single lamp.

The lamp L is shown connected in series with a relay R together with which it may be energized by means of two circuits.

*Explanatory circuits*

One of these circuits, hereafter referred to as the initiating or pilot circuit, comprises a normally open movable contact $p$ which cooperates with a fixed contact $h$, the latter being connected by means of a wire 115 to one end of the coil of the relay R. The contact $p$ is connected by means of wires 105 and 102 to one pole of a source of electric supply, while the free end of the lamp L is connected by means of a wire 100 to the other pole of the source of supply. While any suitable source of current supply may be used, both D. C. and A. C. I prefer to use D. C. and shall for convenience hereafter refer to a battery as the source of current supply. When the contact $p$ is brought in contact with the fixed contact $h$, the initiating circuit is closed and relay R and lamp L are energized.

Energization of relay R closes a second circuit hereafter referred to as the maintaining circuit. This circuit comprises a stick armature $m$ of the relay R which contacts with an upper contact $m'$, when the relay R is energized.

When, due to the just referred to closure of the initiating circuit, the relay R is energized and armature $m$ attracted, the maintaining circuit is closed as follows: from the positive battery through wire 100, lamp L, coil of relay R, armature $m$, contact $m'$, wire 118, wire 101, back to negative battery. It should be noted that while the initiating and maintaining circuits may have separate sources of current and different voltages, as a rule I prefer to use a common source of current supply and the same voltage for both circuits, and to illustrate this I have shown the wires 102 and 101 connected with dotted lines.

When the maintaining circuit is thus established, the relay R remains energized and the lamp L lighted even should the initiating circuit again be broken at contact $p$.

Fig. 3a illustrates the controlling circuits just described for a plurality of lamps, as well as further controlling devices in the nature of circuit-breakers for the initiating and maintaining circuits.

The individual circuits of the lamps L—1, L—2, L—3, etc., are the same as shown in Fig. 3. However, there is interposed in the initiating circuit a circuit-breaker C which is common to all the lamps and in the maintaining circuits there are interposed circuit-breakers B1, B2, etc., each of which is common to all of the lamps of one horizontal row.

The circuit-breaker C consists of a rotating contactor $u2$ provided on its periphery with two narrow segments $x2—x2$ of insulating material, diametrically opposite each other. Cooperating with the contactor $u2$ are two spring contacts $c—c$, so that the contactor $u2$ bridges the spring contacts $c—c$ except for the short time-interval when the spring contacts engage with the insulating portions $x2—x2$.

The circuit-breakers B1, B2, etc., interposed in the maintaining circuits of the lamp and relay combinations are of similar construction to the circuit-breaker C. For instance the circuit-breaker B1 consists of a rotating contactor $u1$ provided on its periphery with two narrow segments $x1—x1$, of insulating material, which are diametrically opposite each other.

Two spring contacts $b1—b1$ cooperate with the contactor $u1$ and are bridged by the same except for the small intervals of time in which they lie on the insulated segments $x1—x1$.

The use of individual circuit-breakers B1, B2, etc. in the maintaining circuits of groups of lamps rather than of a single circuit-breaker for all of the lamps of the display board while advisable to sub-divide the total current passing through the lamps—such total current being in usual installations of considerable magnitude—is particularly of importance in increasing the flexibility of the system, as will later appear from the explanation under the heading "Initiating and maintaining circuit breaker operation—Lamp brilliancy"

While I have shown in Fig. 3a a common circuit-breaker B for all of the lamps of a horizontal row, conditions may require a further sub-division; also, instead of controlling the maintaining circuits of the lamps of a horizontal row by a common circuit-breaker, the lamps of a vertical row or of any other selected group of lamps can be thus similarly controlled.

On the other hand, while as a rule it is sufficient to provide a single circuit-breaker for the initiating circuits of all of the lamps of the display board, so far as the question of current sub-division is concerned since the current broken by same is of small magnitude, in some cases a plurality of initiating circuit-breakers may be utilized each for a given group of lamps for added flexibility.

The operation and function of the circuit-breakers B and C will be more fully explained later on. Here it should be only pointed out that upon manual or automatic closure of selected contacts $p$, as, for instance, the contact $p$—2 of Fig. 3a, the corresponding lamp L—2 and relay R—2 are energized by the initiating circuit, provided the metallic portion $u2$ of the circuit-breaker C is contacting with the spring contacts $c$—$c$.

Upon energization of the relay R—2 the armature $m$—2 is attracted and the maintaining circuit of the relay R—2 and lamp L—2 is established, provided the metallic portion $u1$ of the circuit-breaker B1 is contacting with the spring contacts $b1$—$b1$, and, even should the contact $p$—2 be broken in the meantime, the relay R—2 remains energized and the lamp L—2 lighted as long as the maintaining circuit is not broken, i. e., until the insulated portions $x1$—$x1$ come under the spring contacts $b1$—$b1$ of the circuit-breaker B1.

The circuit-breaker C and the circuit-breakers B1, B2, etc., thus control the automatic closing and opening of the initiating and maintaining circuits. However, the selection of the lamps to be lighted is through the actuation of the contacts $p$. The actuation of these contacts, as well as the sequence and duration of the various conditions set up in the controlling devices and circuits will be more fully explained later on.

Switches $s$—6 and $s$—7 may be provided to by-pass the circuit-breakers B and C for reasons later explained.

Instead of using the arrangement of Fig. 3 in which, as shown, the lamp L is included in both the initiating and the maintaining circuits, it is also feasible, as shown in Figs. 3b and 3c, to place only the relay R in the initiating circuit, and light the lamp L only through the maintaining circuit. Thus, upon closure of the contact $p$, Fig. 3b, the relay R will be energized through a circuit going from plus battery, wire 100, relay R, wire 115, fixed contact $h$, movable contact $p$, wire 105 and wire 102, back to negative battery. Energization of the relay R causes the armature $m$ to be attracted and the maintaining circuit to be established. The lamp L is now lighted by means of the following circuit (Fig. 3c): plus battery, wire 100, relay R, armature $m$, contact $m'$, lamp L and wire 101, back to negative battery.

It should be noted that with such arrangement and using the same voltage for the initiating and maintaining circuits, a higher pick-up voltage for the relay proper may be obtained than in the lay-out shown in Fig. 3.

The use of a plurality of initiating circuit-breakers is illustrated in Fig. 3d, which is similar to Fig. 3a except for the following: The wire 104 is terminated at the lower row of lamps so that the initiating circuit-breaker C and the switch S6 controls only the row of lamps 47 and 48. A second initiating circuit-breaker C1, which is similar in construction to the circuit-breaker C, and which operates in synchronism therewith, is provided between the wire 110 and 104' and controls only the upper row of lamps 44 and 45. A switch S8 is provided to by-pass the circuit-breaker C1.

Referring now to Figs. 1, 2, 6 and 7, I shall describe the devices and circuits of a more complete apparatus for my sign system, Fig. 1 showing an exemplification of the physical layout of the most important circuit controlling apparatus, and Fig. 2 showing a simple and comprehensive diagram thereof, Figs. 6 and 7 showing certain of the controlling mechanism on a larger scale.

The various control means, such as relays, circuit-breakers and switches for the explanatory circuits heretofore described, with reference to Fig. 3a, are also utilized in the control system illustrated in Fig. 2.

In Figs. 1 and 2 only a few lamps and relays are indicated in a diagrammatic way, the layout of the display board or sign board for the lamps and the relays being illustrated in Figs. 20 to 22.

Similarly to the arrangement discussed in connection with Figs. 3 and 3a, there is provided for each lamp L—1, L—2, etc., a relay R—1, R—2, etc., and an initiating and maintaining circuit for the energization of the relay and the lighting up of the lamp.

*Control board—Platens and sub-panels*

I shall first describe my apparatus when used for the display of still signs and confine myself to the description of the instrumentalities required therefor.

The various controlling devices which are mounted on a control board J, consist of a panel 40 of insulated material carried by legs 41 (see Figs. 6 and 7) by means of which it rests on a suitable supporting frame or table 38.

The panel 40 carries two platens N—1 and N—2 and two corresponding sub-panels V—1 and V—2, the two platens N—1 and N—2 and the two sub-panels V—1 and V—2 being respectively identical in construction.

While I shall first refer to the contact platen N—1 and its sub-panel V—1—which are as a rule those used for still displays—since the construction details of platen N—2 and its sub-panel V—2 are identical with those of platen N—1 and its sub-panel V—1, reference will be made at times to the parts of platen N—2 and sub-panel V—2 where such parts are more clearly illustrated in the figures than the corresponding parts of the platen N—1 and sub-panel V—1.

The panel 40 is provided with an aperture 44 adapted to receive the contact platen N—1 which is preferably removable from the panel and which consists of a base 45 of insulating material into which are inserted contacts 46, the number and disposition of which preferably correspond to that of the lamps of the display board. The contact platen is reinforced on its two longest edges by angle irons 49—49 and rests with its two recessed sides 52 on corresponding supporting ledges 53 of the panel 40 (Fig. 6). The platen is normally secured in place by screws 67.

The contacts 46 are provided with downward extending reduced portions 47 (see Fig. 7). While the contacts 46 may consist entirely of the same conducting material, for instance, brass, I prefer to make their upper contacting portion of a metal specially suited for contacts, for instance, by providing separate tungsten discs 48 which are preferably welded to the contacts 46 and constitute the upper contacting face thereof.

The sub-panel V—1 is disposed underneath the platen N—1 and carries metal cups 58, the number and disposition of which correspond to those of the contacts 46 of the platen N—1. The metal cups 58 are partly filled with mercury 60 and the relative disposition of the platen N—1 and sub-panel V—1 is such that the reduced portions 47 of the contacts 46 immerse in the mercury 60 of the corresponding cups 58.

The cups 58 are provided with downward extending cylindrical sleeves 59, in which are soldered or otherwise secured the ends of corresponding lead wires 115 connecting to the individual lamps.

I prefer to combine the sub-panel V—1 for the platen N—1 and the sub-panel V—2 for the platen N—2, in a single panel 56 and support this panel by brackets 57—57 (see Fig. 6).

Stylus operation

As stated above the contacts 46 correspond in number and disposition to the lamps of the display board and each contact is connected by means of the extension 47, mercury 60, sleeve 59 and wire 115 to the corresponding relay R and lamp L (see Fig. 1). For instance, the third contact of the second horizontal row of the platen N—1 will correspond to the third lamp in the second row of the display board. To illuminate any selected lamp a metallic stylus P or other similar contacting device is brought into contacting position with the corresponding contact 46 of said lamp, and thereby energizes its relay and lights its lamp by the circuits more clearly shown in Fig. 2.

Assume that the switch s, which is a master switch in the common supply lines of the lamps, and the switches s—6 and s—7 are closed and the switch s—2 is in contact with terminal o—10 as shown. The initiating circuit of the relay R and lamp L will be closed when the stylus P is brought into engagement with the contact 46 corresponding to the lamp L. The initiating circuit can then be traced as follows: From battery H, through wire 101, wire 102, terminal o—10, switch s—2, wire 103, switch s—6, wire 104, flexible connection 104', stylus P, contact h (which comprises the contact 46 with its extension 47, the mercury 60 and the sleeve 59), wire 115, relay R, lamp L, wire 100, switch s, back to battery H. Energization of the relay R, causes the armature m to be attracted, thus closing the maintaining circuit, which can now be traced as follows: From battery H, through wires 101 and 102, switch s—2, wires 103, 106, 110, through switch s—7, wire 118, contact m', armature m, relay R, lamp L, through wire 100 and the switch s, back to battery H. The lamp L now remains lighted even should the stylus P be removed from its corresponding contact.

By moving the stylus over successive contacts 46, so as to describe any prearranged or improvised design, figure or script, lamps corresponding to the contacts so passed, will successively be lighted, causing the display of the design or script which has been traced on the platen. As previously stated, lamps once lighted will remain lighted even after the stylus P leaves their corresponding contacts 46. After the desired design has been traced, and thus the corresponding lamps illuminated, this display will remain as long as desired. However, by opening the switch s and thus breaking the maintaining circuits all of the lamps will be simultaneously extinguished. If the stylus P has been in the meantime removed from the platen the switch s can be re-closed and no lamp will appear lighted and the sign is ready for a new display.

In practice I provide for suitable jacks 66 (Fig. 1) connected to the wire 104 in any one of which the flexible lead 104' of the stylus may be plugged, this lead being sufficiently long to enable the stylus to contact with all of the contacts 46 of the platen. If desired a number of stylii may be plugged in and simultaneously operated.

Instead of using a stylus having a single contact, one having a plurality of contacts for engaging several platen contacts simultaneously may be used or one which has multiple contacts in the form of a brush.

I desire at times to utilize stencilled sheets, perforated or cut out at points or along lines respectively corresponding to the desired contacts of the platen, in connection with wire brush contacts and manual control. The stencils may be introduced onto the platen from the sides thereof, and I provide means whereby the stencils may be rapidly interchanged without the necessity of the operator locating each with reference to the platen. To this end I mount on the control board, as shown to the left of the platen N—1 in Fig. 1, a pair of guide rails 65—65. These rails are arranged in parallel with the platen, partially overlapping the latter, and are spaced a determined distance from the platen, and between such rails the stencils may be accurately and rapidly guided into position upon the platen and removed therefrom for interchanging.

Pantograph operation—Initiating and maintaining circuit-breaker assembly

I have also provided means whereby drawings, cartoons, or designs and the like may be reproduced upon the display board from a master drawing, cartoon, design or the like, by tracing over the lines which go to make up the latter. To accomplish this I provide a novel pantograph construction in which the pantograph forms a part of the circuit and has means for tracing the drawing or design and for simultaneously closing the circuits of the lamps at the platen contacts and combines in its structure means for completing these circuits at the pantograph.

Referring more particularly to Figs. 23 and 24, the pantograph includes two pairs of parallel arms 230—230 and 231—231 interconnected with each other by a 4-arm connecting piece 232, in the form of a cross, to the end of the arms of which the parallel arms are respectively pivoted as shown, the arm pairs 230—230 and 231—231 moving in different horizontal planes. The free ends of the arms 231 are pivoted to a double-armed strip 234, one arm constituting a pointer 236 adapted to follow a selected design placed on the left side of the platen N—1, while the other arm 237 is a contactor which follows over the contacts 46 of the platen the movements described by the pointer 236.

The free ends of the arms 230 are pivoted on pins 238 vertically extending from a cross-arm 239 provided with a handling knob 239'. Two locating pins 240 are provided on the cross-arm 239, by means of which the pantograph is inserted in two corresponding jacks 66a—66a (see Fig. 1) electrically connected with the wire 104. The electric connection to the contactor 237 is obtained through wire 104, jacks 66a, pins 240, pivot pins 238, parallel arms 230, connecting cross 232, parallel arms 231, either directly to the contactor 237, or preferably, as shown, through strip 234, pointer 236 and a manually controlled interrupting switch 242.

In this latter case I provide for an insulating spacer 246 between the strip 234 and the contactor 237 and also provide an insulated terminal 247 on top of the strip 234 which I connect by means of a flexible wire 248 with the contactor 237. The interrupting switch 242 is secured by means of its spring 243 to the tracer 236 and is electrically connected therewith. The switch 242 is normally opened by the spring 243 but completes the circuit to the contactor 237 from pointer 236 through spring 243, switch terminal 247, wire 248 upon its manual depression. Supporting studs 245 are provided on the various parts of the pantograph to insure free and parallel movement of the pointer, contactor and the arms.

A convenient method of using the pantograph is by prearranging designs on cross-section paper, divisions of which correspond to the disposition of the contacts 46 of the platen, as indicated in Fig. 23 at 249.

For the display of another type of sign which I refer to as the "silhouette," the exact character of which I shall describe later on, and the display of running words, sentences, etc., I employ, besides the devices and circuits described in connection with the still or standing signs, power-driven circuit-breakers C and B interposed in the initiating circuits and maintaining circuits respectively.

These circuit-breakers are of the type referred to in connection with Fig. 3a and are utilized with the control circuits and apparatus employed in an installation such as illustrated in Figs. 1, 2, 6 and 7.

The circuit-breakers C and B (Fig. 2) are of identical construction there being, as already stated, as a rule but a single circuit-breaker C for all of the initiating circuits of the lamps and a plurality of circuit-breakers B one for each horizontal row of lamps.

All of the circuit-breakers B and the circuit-breaker C form a common assembly Y (see Figs. 1, 6 and 7), which consists of a cylinder 75 of insulating material carried by a shaft 73 and rotatably supported in bearings 74 and 88. The circuit-breaker C appears at the right-hand end of assembly Y of Figs. 1 and 6, the remainder being circuit-breakers B.

Imbedded in corresponding recesses of the cylinder 75 and suitably secured thereto are a plurality of semi-circular segment pairs designated $u$—1 for breakers B and $u$—2 for breaker C, the segments of one pair being separated from each other by two diametrically opposite strips $x$—$x$ of the cylinder 75, only one of which appears in Fig. 1. These strips run throughout the whole length of the cylinder and thus constitute narrow insulated portions between the two segments of each pair. In the diagrammatic showing in Fig. 2 these strips are designated $x$—1 for the circuit-breakers B and $x$—2 for the circuit-breaker C for sake of clearness of illustration in tracing the circuits. Each contact pair is also insulated from the adjacent contact pairs by portions $x$—10 of the insulating cylinder 75. The segment pairs correspond in number to the circuit-breakers of the assembly Y, each segment pair $u$1—$u$1 forms part of the circuit-breakers (designated as B—1, B—2, etc., in Fig. 3a), and the segment pair $u$2—$u$2 forms part of the circuit-breaker C, as stated. Cooperating with each segment pair are two diametrically opposite spring contacts $b$ and $c$, of which the contacts $b$1—$b$1, $b$2—$b$2, etc., of Fig. 3a form part of the circuit-breakers B—1—B—2, etc., and the contacts $c$—$c$ form part of the circuit-breaker C.

The shaft 73 is driven by suitable driving means here illustrated as an electric-motor M carrying on its shaft 70 a gear 71 which engages a gear 72 of the circuit-breaker assembly Y.

The current for the motor M may be supplied from any suitable source of current, for instance, as shown in Figs. 1 and 2, the battery H. The energizing circuit of the motor can be traced as follows (see Fig. 2): Battery H, wire 101, wire 120, switch $s$—4 (which when open rests with its free end on a contact $o$ and for normal operation rests with its free end on a contact $o$—2), through rheostat $r$, motor armature M, motor field $k$, wire 125, wire 100, switch $s$, back to battery H. When the switch $s$ is closed and the switch $s$—4 is engaging contact $o$—2, the motor M is thus energized and drives the circuit-breakers B and C at any selected speed, depending on the adjustment of the rheostat $r$.

Instead of using a series motor as here illustrated, a shunt motor may also be used, or, if so desired, an A. C. motor of either the induction or of the synchronous type may be used.

With the apparatus so far described display of silhouettes occurs as follows:

*Silhouette operation*

Figure 19:
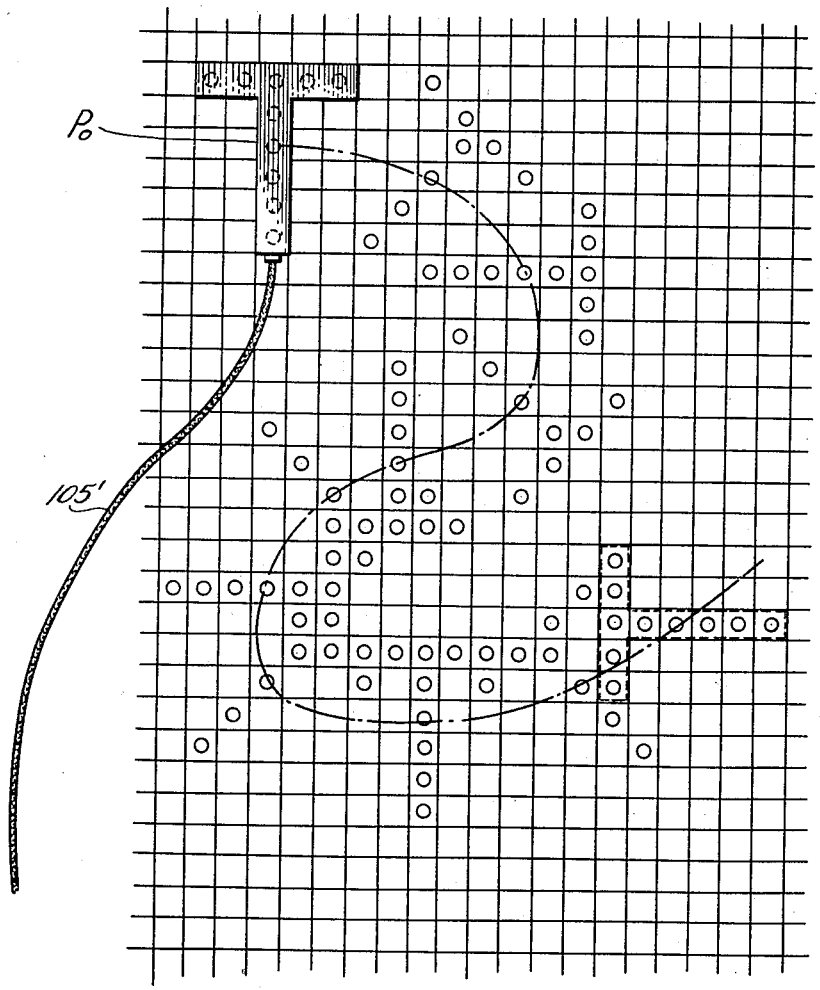
Fig. 19 is a diagram illustrating the effect obtained with my so-called silhouette type sign.

Instead of the single metallic stylus P previously described, a metallic contactor Po is used, this contactor having outlines corresponding to the silhouettes to be displayed, as, for instance, the T shaped contactor shown in Fig. 19. This metallic contactor is connected through a flexible plug connector 105' and the jack 66 (Fig. 1) to the wire 104 (Figs. 1 and 2).

In moving the contactor Po over the contact platen and by energizing the initiating and maintaining circuits in the sequence to be described hereafter, a sign will be displayed in the form of a continuously moving silhouette, which in all of its intermediate positions will appear to the eye as being of the shape of the contactor Po, notwithstanding the fact, as shown in Fig. 19, in some of the intermediate positions the contacts covered by the contactor, due to the necessarily limited number thereof, may give a distorted picture of the contactor Po. The sinuous dotted line in Fig. 19 indicates the path of travel of a point in the silhouette in moving from the full line position to the dotted line position, and the intermediate groups of contacts shown indicate some of those swept by the silhouette in moving from the one position to the other.

Assume now that the motor M is energized and the circuit-breakers B and C rotated at a constant speed, the energization of the relays R and the lighting and blanking of the lamps L will be as follows:

Referring to Figs. 1 and 2 and tracing the circuits on Fig. 2 and assuming that the switches $s$ and $s$—1 are closed and the switches $s$—6 and $s$—7 are open, and the switch $s$—2 in contacting position with contact point $o$—10 and switch $s$—4 in contacting position with contact $o$—2, the driving motor M is started and the lamps corresponding to the contacts 46 of the platen covered by the contactor Po will be energized as soon as the metallic portion u—2 of the circuit-breaker C contacts with the spring contacts c—c of this circuit-breaker. This energization will occur by means of the initiating circuits (which are similar to those already described in connection with Fig. 3a), which may be traced on Fig. 2 as follows: Battery H, wire 101, wire 102, contact o—10, switch s—2, wire 103, wire 106, circuit-breaker C, wire 107, switch s—1, wire 108, wire 104, flexible connection 105' (assuming it to be substituted for the flexible connection 104' of the stylus), contactor Po (substituted for the stylus P), through contacts h covered by contactor Po, and the individual wires 115, relays R and lamps L coresponding to these contacts (only one of each of which is shown in Fig. 2), through common wire 100, back to battery. The relays R now being energized through the initiating circuit attract their armature m and establish their respective maintaining circuit as follows: Battery H, wire 101, wire 102, contact o—10, switch s—2, wires 103, 106 and 110, through the circuit-breakers B (one for each horizontal row as described with reference to Fig. 3a) and the corresponding bus lines 118 (one for each horizontal row as illustrated in Fig. 3a), branch wires 118' (one for each lamp of the row), contacts m', armatures m, relays R and lamps L, back to battery via wire 100. The circuit-breakers B being synchronized with the circuit-breaker C, bridge their contact springs at the same time as the circuit-breaker C bridges its contact springs.

The lamps so lighted will remain energized as long as their maintaining circuits are closed, thus until the insulated portions of the circuit-breakers B have engaged the spring contacts of the circuit-breakers at which time these circuits are broken and the lamps extinguished. But they will be immediately relighted by the establishment of the initiating and maintaining circuits unless the contactor Po has moved off the contacts 46 covered by it. As the contactor Po is moved to new positions the initiating and maintaining circuits of the lamps corresponding to the contacts 46 covered by the contactor in these various positions will be established and broken and the corresponding lamps lighted and extinguished. If the movement of the contactor Po and the speed of the circuit-breaker Y is properly harmonized, a moving display is transmitted to the eye which corresponds in shape to the shape of the contactor Po, notwithstanding the fact that in intermediate positions the display may be actually distorted, as already referred to.

I may also employ silhouettes which, instead of being fixed in outline, are articulated, for instance, a figure jumping jack in which the arms and legs are jointed and are pivoted to the body, the articulated members being controlled in position by the hand and fingers of the operator or automatically. In such case I prefer to define the configuration of the silhouette to be produced by a series of contacts electrically connected with and loosely and self-adjustably mounted on the frame of the silhouette, to compensate for departures from parallelism with the platen which may occur as the former is shifted about the platen.

It should be noted that a great variety of such silhouettes can be made up, and in case it is desired to use both platens, or in a construction in which three or more platens are included, individual silhouettes working on different platens may show up as a combined display on the lamp panel; further, that a silhouette may be used in combination with a fixed or running sign, either using the same or different platens, and a great variety of novel and pleasing effects being thus obtained.

*Record operation—Contact block*

To reproduce running words, sentences or prearranged designs, I prefer to use a perforated or stencilled controlling band or record I, which acts similarly to a music roll or record, from which it might be said the light sign is "played."

The display of letters, designs, etc., on the board under control of the record may progress in any desired direction, as for instance, in a horizontal direction as is the case in the so-called "multigraph system" of moving letter signs now in use to which, as the letters are running in a single horizontal line, I shall refer as the ribbon type sign. However, for reasons more fully set forth hereafter, I prefer to have the display brought into view progressed in a vertical direction.

The record is drawn between two sets of corresponding contacts, the lower set consisting of the contacts of the contact platen N—2, already described as identical in construction with the contact platen N—1, and which is arranged alongside the other, while the upper set is formed of individual spring contacts electrically and mechanically interconnected with each other in a common block W. The controlling record is freely fed between the two sets of contacts, whereby the contact springs are separated by the record from their respective platen contacts, until a perforation of the record comes beneath a spring contact, whereupon the latter is permitted to press upon its respective platen contact, thereby establishing the circuit of the corresponding lamp.

The record I is made up of suitable insulating material which is thin and pliable, but sufficiently strong. It may be of any desired length and sent through the feeding mechanism similarly to individual music rolls or it may form a continuous loop and be fed from a receptacle between the two sets of contacts through the feeding mechanism and back to the receptacle.

The upper contact block W is shown in detail in Figs. 9 to 14a. It consists of a metal block 200 provided on its lower face with crosswise running toothed recesses 201, to receive the individual contacts p, designated in Fig. 2 as p—1, p—2, etc. The individual contacts p consist of obliquely disposed resilient tongues 202, which, as shown in Fig. 14a, for each horizontal row extend from a single metal strip 206. The ends of the tongues 202 are bent and are provided with an embossing 203 or other suitable contacting point. A contact strip 206 is placed in each recess 201 so as to rest on the oblique face thereof, and is reinforced by strips 204 placed on top of the contact strip 206, such contact and reinforcing strips being jointly secured by means of screws 205 to the block 200.

The underneath surfaces of the plate 200 are cut away beyond the ends of the tongue strips 206 and rest on two insulating strips 210, to which the plate 200 is properly secured by means of screws 208. The strips 210 are beveled at their front ends 209, and are provided with ledges 211 which extend the length of the block and support the latter on the platen.

Attached to the insulating strip 210 by means of screws 211 are brackets 218, which carry on their lower face metal strips 212 and 212—a, respectively. The strip 212—a is provided with a flexible plug connection 105 which, when the contact block is in position to be operated in conjunction with the record, is plugged into one of the jacks 66, as shown in Fig. 1. Each metal strip 212 and 212—a is provided with a locating pin 216, which when the contact block W is placed in its operative position on top of the platen N—2, is placed in corresponding holes 215 (see Fig. 1) of the platen N—2, to bring the contact tongues 202 in proper juxtaposition with the respective contacts 46 of the platen. When in this position the contact block W is resting with the lower faces of the ledges 217 and of the strips 212 and 212—a on the contact platen N—2, whereby the contact tongues 202 are about halfway compressed and insure thereby a light but positive contact with the platen contacts 46 when the perforations of the record permit them to do so.

As previously stated, the contacts 46 of the contact platen N—2 as well as the contacts 202 of the contact block W have the same number and arrangement as the lamps of the sign.

The record is perforated by punching or other suitable method, and the individual holes are made to correspond in disposition to the contacts of the platen and contact block, so that all of the holes forming the patterns to be displayed which pass at some instant between the platen and contact block simultaneously align with the contacts. The perforations are so grouped as to make up the desired letters or designs, and since the lamps and the contacts 46 and 202 form rectangular systems, the holes of the records are disposed along horizontal and vertical lines.

The perforated records are preferably provided on both sides near to the edges with holes q—1 (see Figs. 15–18) to engage corresponding teeth of the feeding mechanism hereafter described, and thereby provide for a positive and predetermined progress of the record. It should be noted that I prefer that the distance between the holes be equal to the distance between successive horizontal rows of perforations forming the record patterns. However, this is not of primary importance.

*Record feeding mechanism*

For the feeding as well as proper tensioning of the perforated record I, there is provided a feeding mechanism located in the rear of the platen N—2 and mounted on the panel 40. This mechanism comprises two side frames 95 and 96 on which are supported the rollers of the feeding mechanism. The feeding mechanism may be driven by any suitable means, as for instance illustrated in Figs. 1, 6 and 7, from the shaft 73 of the circuit-breaker assembly Y. This shaft carries a pinion 87 which engages a gear 142 (see Fig. 1), of a lower driving roller 141, (see Fig. 7) carried on a shaft 140. The driving roller 141 is provided on both sides with teeth 149, which engage the perforations q—1 provided on both sides of the perforated record. The roller 141 is also provided on its two ends with collars 160, (see Fig. 6) for the sidewise guiding of the record.

An upper driving roller 145, similar in construction and dimensions to the roller 141, is supported by the frames 95 and 96, this roller being disposed somewhat in advance in respect to the roller 141, and is driven therefrom through engagement of a gear 143 of the shaft 140 with a gear 144, provided on the shaft 145a of the upper driving roller 145. Similarly to the roller 141, the roller 145 is also provided with teeth 149 and collars 161 for the forwarding and guiding of the record.

Also supported by the frames 95 and 96 and in the rear of roller 141 and at the same height as the roller 145, is provided a roller 146, which is of the same dimensions as the rollers 141 and 145. The roller 146 is also provided with guiding collars 160 at both ends, but does not carry teeth. It is driven by a gear 163a carried on its shaft 163, which engages the gear 143 of the roller 141.

Swingedly pivoted in the frames 95—96 is a roller 148, which when swung in its operative position loosely rests on the top of the roller 146. For this purpose the shaft 164 of the roller 148 is rotatably supported by two side arms 152—152, which in their turn are pivotally supported by means of detachable pivots 154 by the side frames 95 and 96. The arms 152—152 are reinforced by a suitable distance piece 153.

The shaft 164 of the roller 148 carries a gear 150, which engages when the roller 148 is in its operative position a gear 151 of the shaft 163 of roller 146.

The roller 148 when swung from its operative position by a movement of about 180° permits easy access for insertion of the records.

Located in the rear of the roller 148 is a guide apron 165, which is swingedly supported at its heel 166 (Fig. 7) by the panel 40. The shape and disposition of the apron is such that, when swung in operative position, its free end comes to rest against the roller 146, slightly below the top thereof, and slopes downwardly towards its heel whereby it provides for a convenient rest for the record I as it moves from the feeding roller towards its receptacle, as will be explained later on.

As the forwarding rolls are driven from the circuit-breaker assembly their speed is in a positive and fixed relation to the speed of the circuit-breaker.

For the proper feeding of the records towards the contact platen I preferably provide an idling roller 170 mounted in front of the platen, the roller being provided with side collars 167 to prevent sideward movement of the record, and I place a suitable guide rod 175 in front of this roll and feed the paper between the rod 175 and the roll 170. To properly stretch the record I preferably provide an idling top roller 172, which is pivoted in swingedly mounted bearing arms 174 and loosely rests in its operative position on top of the roller 170. When swung from its operative position toward the contact block W it permits easy access for the insertion of records. The record may be fed from a receptacle (not shown), up through a slot in the table 38, between the rollers 170 and 172, thence across the platen N—2, beneath the contact block W, beneath and around the lower roller 141 and from it forwardly and around the roller 145, and rearwardly between the rollers 146 and 148, thence over the apron 165 back to the receptacle.

*The records*

Figs. 15 and 18 illustrate fragments of the record for various displays of running words, figures and designs. For the purpose of illustration, a record of 6″ width has been selected with one-eighth of an inch spacing of the platen contact assumed, thus corresponding to 48 contacts per row. However, it should be noted that as a rule two or three spaces are left blank on each side of the record. The height of the contact platen is assumed to be 30 contacts with one-eighth of an inch spacing of the contacts. Of course any desired width or height can be selected, the number of contacts and their arrangement corresponding to the number and arrangement of the lamps on the display panel.

Irrespective of the width and of the total number of lamps per row, I have found it preferable—for more convenient handling of the records—to sub-divide the record in standard widths, for instance, into 6" wide records in case of spacing of one-eighth of an inch just assumed. In case of a display board comprising 120 lamps per row, I then use three individual records placed side by side properly overlapped if necessary, co-operating with corresponding groups of contacts and fed by individual or interlocked feeding mechanisms. As the beginning of each record is marked and the individual records interlocked, the same display of the lamp will result as if a single record of a triple width would be employed.

When displaying running words, the height and width of the letters may be varied. For instance letters seven contacts high and five contacts wide are found very suitable,—running words composed of such letters being shown in Fig. 15. However, letters of greater and smaller width and height can be used. For instance, letters five spaces high and three spaces wide are shown on the top row of Fig. 18, while in the fourth row of Fig. 15 the letter "S" is shown as being nine spaces high and five spaces wide.

The interval between the individual letters may also be varied. I have found that with the letters of the size indicated, about three spaces give good definition of the individual letters, although smaller and greater intervals may be used. In the same way intervals between the rows may be conveniently varied. With a height of the letters as indicated, four to five space intervals give good separation of the rows, although both larger and smaller line intervals may be employed.

In the Figures 17 and 18, besides letters and figures, there are also shown various designs, most of which are of symmetrical arrangement. However, it should be noted that designs of any kind or character may be made up.

In the operation of the sign under control of the record, the successive horizontal lines of the display are brought into view at or adjacent the bottom of the bank of massed lamps, and the display moved upwardly. Should the vertical components of the configurations or characters comprising the data, in the succeeding rows of data punched on the record, fall in line one below the other, it will be readily recognized that the same objection will arise, as is now true of the ribbon type of sign where the letters move horizontally from right to left, namely, that there would be certain rows of lamps which would be used inordinately as compared to other rows, with the result of a comparatively short lamp life of the inordinately used rows.

I have found that by staggering the vertical components of the characters or configurations forming the succeeding horizontal rows of data, instead of unduly using particular vertical rows of lamps, I distribute the use of the lamps generally throughout the length of the horizontal lines of display with the result that a substantially uniform use of the lamps is obtained, and an average use quickly established. The record thus has the lines of data placed thereon transverse to the direction of travel of the record and of the display in the lamp mass, and the data is composed of lines of characters defined by the contact controlling perforations, and the perforations forming the vertical components of characters in succeeding lines of data are staggered. As has already been pointed out in the ribbon type of display, there are certain rows of lamps, namely, the top and bottom and intermediate rows, corresponding to the cross bars of the letters which get a great excess of use as compared with the other horizontal rows, with the result that the lamp life in the excessively used rows is comparatively short, necessitating frequent replacements. In my method wherein the display is by succeeding lines of letters, there being spaces between the letters as in ordinary printing, I can obtain the staggered arrangement of the vertical components in the succeeding lines, but this is not possible in the ribbon type, because in the latter the letters follow one behind the other along a horizontal path, in rapid succession, and must for ease of recognition and reading be thus aligned horizontally as in printing. In my method, however, while there are several horizontal lines displayed at the same time in linotype fashion which may be read in the normal way, the staggering of the vertical rows can take place without any inconveniences whatsoever in the recognition or the reading of the data being displayed. Indeed, from observing the sign, one is not conscious that any staggering takes place except upon close and careful observation. I also intend to use at times inclined, or slanted letters or characters, which also tend to afford a uniform lamp use, especially when properly positioned or staggered.

Furthermore, in my method of display, further important advantages are obtained over the ribbon type of display, concerning the length of time in which the words displayed by my method are visible, the character and life of the lights used, the speed of display, the length of duration of display, and greater readability and continuity of indications. This may be illustrated in a simple way by considering, for instance, the display of a ten-letter word by the ribbon type and by my method, the letters being made up of seven horizontal rows of lights, and four vertical rows of lights, there being used a spacing of three vertical rows between each letter, and assuming an additional spacing of one vertical row at each end of the word, there being a space of full visibility of five rows or spaces. In the ribbon type sign where the letters appear in horizontal sequence, there would be required in order to bring the full word into visibility, sixty-nine steps, the space of full visibility five steps, with a total of seventy-four steps or rows; whereas, in my method in which the movement is in a vertical direction, considering the display of the one word only, and the same requirement of a spacing of five points between the word and the next one below it, there would be required to bring the full word into visibility only seven steps, the space of full visibility five steps, total twelve steps, as against seventy-four steps for the ribbon type of display. As to the time element involved for the display in the two types, assuming that two seconds are required for the transition from the beginning of sight of the first letter of the ten-letter word assumed above, to the beginning of the disappearance of the first letter, in the ribbon type of display, the time required for each point of advance would be 1/37 of a second and the time of full visibility, assuming the five points, would be 5/37 of a second.

As against this, assuming the same speed, the advance to full visibility in my system would be 7/37 of a second instead of two seconds, that is, roughly, one-tenth of the time required for the ribbon type of display. For the display of data contained in two lines in my system, assuming the five-point space between lines, 19/69 of a second would be required as against four seconds for the ribbon type of display, or, roughly, about one-fourteenth of the time that it would be required in the ribbon type to bring two full words into view.

It follows that if the same speed of making and breaking circuits and transition of the whole image is used in my system as in the ribbon type display, I can operate many times faster with my system as against the ribbon type, retaining the same visibility and using the same kind of lamps, and where there are two or more lines I can, in addition to showing multiple words simultaneously, continue the full visibility of each several times longer than in the ribbon type of display, and in addition, as has already been pointed out, I can distribute the use of the lamps substantially uniformly amongst the whole mass. Again, I am able to display in a given time as much, and more, information as the ribbon type of display, at the same time making the speed of light changes in my system much slower, thereby obtaining the important advantage of minimizing the flickering common to and objectionable in the ribbon type of display, and at the same time am enabled to use lamps of standard manufacture. In the ribbon type signs, lamps of special construction are utilized, designed to obtain relatively high brilliancy at high speeds of light changes and having correspondingly relatively short life.

*Initiating and maintaining circuit-breaker operation—lamp brilliancy*

Figs. 4 and 4a to 4g show diagrammatically the sequence of the conditions assumed by the controlling circuits and devices for a lamp L when used in one of the methods of control for a display of running words and for manual operation, especially in connection with silhouettes.

Taking the condition represented in Fig. 4 as the initial operating condition it will be noted that the initiating circuit is broken at the contact springs $c$—$c$ of the circuit-breaker C, and the maintaining circuit is broken at the contact spring $b$—$b$ of the circuit-breaker B, as these contact springs $c$ and $b$ lie on the insulated portions $x2$—$x2$ and $x1$—$x1$ of their respective circuit-breakers. Besides that, the initiating circuit is also broken at the movable contact $p$ and stationary contact $h$, and the maintaining circuit is broken at the open relay contacts $m$—$m'$. As the contactors of the circuit-breakers B and C advance, the respective spring contacts $b$ and $c$ come to contact with the metal portions $u$—$1$ and $u$—$2$, respectively of these circuit-breakers, as illustrated in Fig. 4a. However, the initiating circuit and the maintaining circuits are still broken at the open contacts $p$—$h$ and $m$—$m'$, respectively.

If a perforation of the record I comes to pass between the contact $p$ and its corresponding contact $h$, or if the contact $p$ is represented by a stylus or contactor engaging with $h$ in case of a manual operation, the condition shown in Fig. 4b is established. This results, as shown in Fig. 4c, in the closure of the initiating circuit and the consequent energization of the relay R and of the lamp L by means of the following circuits: From plus battery through wire 100, through lamp L and relay R, wire 115, contacts $h$ and $p$, wire 104, circuit-breaker C, wires 103 and 101 to negative battery. As soon as the relay R is energized, it picks up its armature $m$, as shown in Fig. 4c, which establishes the maintaining circuits of the relay R through plus battery, wire 100, lamp L, relay R, armature $m$, contact $m$, wire 118, circuit-breaker B, wires 110 and 101 back to negative battery. This condition will persist as shown in Fig. 4d, while the rotors of the circuit-breakers B and C still further advance until the initiating circuit is broken. This happens in case of a progressing record, when an insulated portion of the record reaches the contact $p$, and thus electrically separates it from its respective platen contact $h$,—or, in the case of manual operation, when the stylus or contactor is removed from the corresponding platen contact. While the initiating circuit is broken, the maintaining circuit, as shown in Fig. 4c, remains closed. This condition will now persist notwithstanding further rotation of the circuit-breakers, as shown in Fig. 4f, until it has moved so far that the spring contacts $b$—$b$ of the circuit-breaker B engage on the insulated portions $x1$—$x1$. In this position, as shown in Fig. 4g, the maintaining circuit is broken and the relay R deenergized and the lamp extinguished; the initiating circuit is also open at the circuit-breaker C and the condition shown in Fig. 4 again prevails.

Instead of opening the initiating circuit by breaking the contacts $p$—$h$, this circuit may be first broken at the circuit-breaker C, by correspondingly shortening the metallic portion $u$—$2$ of its rotor, as shown in Fig. 5.

Also, by changing the angular relation of the contact segments $u$—$1$ and $u$—$2$ of the circuit-breakers B and C with respect to each other as shown in Fig. 5a, the time interval during which the lamps are lighted may be shortened, to various degrees depending upon this angular relation.

This results in the decrease of the lamp intensity without the use of objectionable resistances, and to the degree selected. By using separate circuit-breakers B and C for various selected groups of lamps and adjusting the corresponding circuit-breakers B and C for different angular relationship, the lamps of the various groups will appear in different brilliancy whereby various novel results may be obtained.

Whenever the circuit-breakers B and C are in operation, with the display under the simultaneous control of the record and silhouette or either alone, the lamp circuits are made and broken in rapid succession so that they would not, unless otherwise provided, attain the brilliancy they would acquire in a still display or when the breaking and making of the circuits is under manual control. In order to have the brilliancy of the lamps when under the control of the circuit-breakers, assuming a standard speed for the driving motor M, the same as for under manual control or at standstill, I provide a booster generator G in the supply circuit to thereby augment the voltage of the battery, an automatic control being provided to energize the booster at a predetermined speed of the motor M, below its standard speed.

The booster generator G may be driven by any suitable motor, for instance, a shunt motor M—1, which in its turn is energized from any suitable source. For proper adjustment of the voltage of the generator, its field winding K—2 is in series with a variable resistance r—1 and is energized from the battery H or any other suitable source of current supply. The energizing circuit of the field coil K—2 also includes a movable contact g controlled by a speed-governor S driven from the gear 71 of the motor M through its gear 77 (see Fig. 1) and cooperating with a fixed contact g—1. By moving the switch s—2 (Fig. 2) to a position whereby it contacts with contact O11, a series connection of the battery H and the generator G is effected and the cumulative voltages of the generator and the battery are applied to both the initiating and maintaining circuits. The circuits thereby go from battery H, wire 101, wire 122, armature of generator G, wires 123 and 117, contact O11 to switch s—2 and from here through the circuits previously traced.

When the motor M is at a standstill, as in the case of a fixed sign, the contact g of the speed-governor S is open and the circuit of the field K—2 broken and no voltage is generated by the generator G. The armature G in this case merely acts as an ohmic resistance of negligible value and the voltage applied to the lamp and relay circuits is that of battery H. When the sign is operated at the selected rate of the motor, the speed-governor S closes its contacts g—g' and thus energizes the field K—2, whereby the generator G supplies voltage to the circuits and increases the lamp voltage by a proper amount to retain the same brilliancy of the lamp as in case of still signs.

To prevent arcing on the governor contact g upon breaking of its circuit, I prefer to provide for the coil K—2 a suitable shunt resistance, for instance a lamp e.

When the circuit-breakers B and C are to be driven at varying speeds, for instance to change the rate of progress of the record—which can be obtained, for instance, as stated by varying the speed of the motor M through adjustment of rheostat r,—I provide for the automatic regulation of the lamp brilliancy an arrangement, as shown in Fig. 8, whereby the speed-governor-operated contact g—2 directly varies the resistance of rheostat r—2 and thus the resistance of the circuit of the generator field K—2.

*Stepped advance*

In case I wish to provide for a stepped advance of the display instead of its continuous progress described so far, I interpose in the initiating circuit a power-driven circuit-breaker F (see Figs. 1 and 2). As driving means for this circuit-breaker I prefer to make use of the driving motor M, whereby, as shown in Fig. 1, I combine the circuit-breaker F with a circuit-breaker D later to be described, into a single assembly which is, by means of its shaft 193, rotatably supported by bearings 195 and 196. The shafts 193 carries a gear 190 which by means of two intermediate gears 191 and 192 engages, and is driven by the pinion 87 of the shaft 73 of the circuit-breaker assembly Y, this shaft being—as already stated—driven by the motor M. Two spring contacts f—1 and f—2 are co-operating with circuit-breaker. The portion u—5 of the rotor of the circuit-breaker F engaging with the spring contact f—1 is metallic throughout while the portion engaging the spring contact f—2 comprises two narrow conductive strips u6—u6 which are electrically connected with or form integral parts of the portion u5 and insulating portions x5—x5 separating the metallic portions u6.

The width of the strips u6 and insulated portions x5 and the speed of the circuit-breaker F in regard to the rate of progress of the perforated record I are so selected, that the spring contact f—2 engages a strip u—6 each time the record has advanced a predetermined number of contacts. For instance, if the height of the letters of the record is selected to be five perforations (corresponding to five contacts 46 and thus five lamps of the display board), with three spaces between two rows of letters, provision is made to engage the spring f—2 with a strip u—6 whenever the record has advanced eight contacts.

When using the circuit-breaker F, the switches s—6 and s—7 as well as the switch s—1 (which for continuous advance is closed to by-pass circuit-breaker F), are open and the initiating circuit can be traced as follows:

From battery H through wires 101 and 102, switch s—2, wires 103 and 106, circuit-breaker C, wire 107, spring contact f—1, contacts u—5 and u—6 and spring contact f—2 of circuit-breaker F, wires 109, 108, 104 and 105, switch s—9, contacts p—1, p—2, etc., and contacts h—1, h—2, etc. through wire 115, relays R, lamps L, through wire 100, switch s, back to battery H. However it should be noted that the initiating circuit is closed only when the record has advanced every sixth, eighth or other selected number of contacts. In this method of operation it will be observed that on the display panel lights corresponding to the perforate configurations will be lighted and almost immediately extinguished, the record advancig the selected number of contacts without affecting the lamps controlled thereby which will remain unilluminated, and upon the next completion of the initiating circuit the corresponding lamps will be lighted again, this time further up on the display panel only to be almost immediately extinguished as before. Thus the display will appear on the panel intermittently and by steps, thus advancing by jumps up the display board, rather than progressing upwardly thereon by continuous movement although the record itself progresses continuously.

It will also be noted in this operation of the system that the circuit-breaker F takes over the control of the initiating circuit from the circuit-breaker C, although the latter is in the circuit. By closing and opening the switch s—1 transition of display from step-by-step to continuous display or vice versa is obtained without any further changes in the system.

In the method of operation just described, the time interval during which the display appears on the board is short compared with the time of darkness. If I wish to make such ratio changeable and increase the time of illumination as compared with the time of darkness and still maintain the step-by-step character of the display I provide means whereby, without changing the speed of other circuit-breakers or the progress of the record, the speed of the circuit-breakers B can be so reduced as to maintain the lamps of a display energized practically until the next energization of the initiating circuits by the circuit-breaker F takes place.

*Intermittent display*

I also provide means for intermittently arresting the continuous or line-by-line progress of the display and such means may be manually or automatically controlled, as follows:

As shown in Figs. 1 and 2, the switch s—4 which is interposed in the energizing circuit of the driving motor M, and as previously stated, is moved to engage contact o—2 for the energization of the motor M, can also be brought in engagement with two additional contacts o—1 and o—3.

For the manual stopping and starting of the driving motor M, the switch s—4 is brought alternately in the positions o—1 and o—3, and thereby in conjunction with a power-driven circuit-breaker D, controls the energization of the motor M as follows:

The circuit-breaker D is illustrated in Fig. 1 as forming a single assembly with the circuit breaker F, the driving means for this assembly having been previously described. The circuit-breaker D cooperates with three spring contacts d—1, d—2 and d—3, and as shown in Figs. 1 and 2 consists of a metal portion u—3 and insulating portions x—3. The metal portion u—3 is so shaped that the spring contact d—2 is contacting therewith throughout the whole revolution of the circuit-breaker D, while the spring contacts d—1 and d—3 are connected with u—3 alternately during half periods of revolution of the circuit-breaker.

The contacts o—1 and o—3 are connected by means of wires 127 and 128, respectively, to contacts o—4 and o—6 of a double-pole double-throw switch s—5. If the switch s—5 is in the position indicated in Figs. 1 and 2, the contacts o—1 and o—3 are connected with the spring contacts d—1 and d—3 respectively as follows:

From o—1 through wire 127, contact o—4, through switch s—5 and heel o—2 thereof, through wire 131 to spring contact d—1; and from contact o—3 through wire 128 to contact o—6, switch s—5 and heel o—9 thereof, through wire 132 to spring contact d—3. The spring contact d—2 is directly connected through wire 130 and wires 120 and 101 to the battery H.

When the switch s—4 is brought from its open position o to the position o—1, the circuit of the motor M is completed as follows:

From battery H, wires 101, 120 and 130, spring contact d—2, contact segment u—3, spring contact d—1, wire 131, heel o—8 and arm of switch s—5, contact o—4, wire 127, contact o—1, switch s—4, wire 126, resistance r, motor M and field coil k, wire 125, wire 100, and back to battery H. The motor M thus being energized, its rotation is started, which in turn causes the circuit-breaker D to revolve. However, when the spring contact d—1 engages the insulated portion x—3 of the circuit-breaker D, the energizing circuit of the motor M is broken and the progress of the sign is stopped. In this position of the spring contact d—1, the spring contact d—3 has come to contact with the metallic portion u—3 of the circuit-breaker. This, however, does not energize the motor M as long as the switch s—4 is in its position o—1, as the circuit leading to the spring contact d—3 is broken at o—3. The sign displayed in this position can now be maintained for any required time. To resume progress of the record, the switch s—4 is manually moved to the position o—3 and the motor M now energized through a circuit which can be traced as follows:

From battery H through wires 101, 120 and 130, spring contact d—2, contact segment u—3, spring contact d—3, wire 132, heel o—9 and arm of circuit-breaker s—5, contact o—6, wire 128, contact o—3, switch s—4 and thus through the motor M to battery H.

It should be noted that the switch s—4 is so designed that when it is moved from one position to another by passing an intermittent position it does not contact with the intermediate position. This can be obtained for instance, by providing a resilient contact arm which is lifted when it is moved from one to another position and only contacts with the contact upon release of the arm.

Instead of obtaining an interrupted progress of the sign by the manual operation of the switch s—4, such may be achieved by automatic means, for instance, by the use of a circuit-breaker E having a suitable individual drive—for instance, it may be driven by a motor M—2 by means of an intermediate gear and cam mechanism (indicated diagrammatically in Fig. 1)—which imparts to the circuit-breaker an intermittent movement. The switch E is preferably of the rotating type with a cylindrical rotor having a conductive portion u—4 and insulated portions x—4 and cooperating with three spring contacts e—1, e—2 and e—3. The spring contact e—2 always contacts with the metal portion u—4, while, due to the shape of the metal portion u—4, the spring contacts e—1 and e—3 contact alternately with the metal portion u—4 and an insulated portion x—4 so that whenever spring contact e—1 is on the metal portion of the contactor the spring contact e—3 is on an insulated portion thereof, and vice versa.

The motion of the circuit-breaker E, as stated, is not continuous but intermittent. Each movement of the circuit-breaker brings the spring contacts e—1 and e—3 from the metal portion u—4 on an insulated portion x—4 or vice versa.

To bring the sign under control of the circuit-breaker E, the switch s—4 is brought into engagement with contact o and the switch s—5 is brought into engagement with the contacts o—5 and o—7.

With the switch s—4 and the switch s—5 brought in the positions just mentioned, and the circuit-breakers D and E in the position indicated in Fig. 2, the circuit of the driving motor M can be traced as follows:

From battery H through wires 101, 120 and 130 to spring contact d—2, contact u—3 and spring contact d—1 of circuit-breaker D, wire 131, heel o—8 and arm of circuit-breaker s—5, contact o—5, wire 133, spring contact e—1, metal portion u—4, and spring contact e—2 of circuit-breaker E, wire 135, wire 126 through resistance r, motor M, thence to battery H.

With the motor M thus energized the driving mechanism is started, and progressed until the circuit-breaker D, which is also set in motion by the driving motor M, has reached a position whereby the spring contact d—1 engages an insulated portion x—3 of the circuit-breaker D, thus breaking the motor circuit at this point. At the same time, the spring contact d—3 has come in engagement with the metallic portion u—3 of the circuit-breaker D; however, the motor circuit remains open as long as the circuit-breaker E remains in the indicated position. The record and thus the sign display is now stopped for a selected time interval, determined by the time lapse between two actuations of the circuit-breaker E. Upon its next actuation the circuit-breaker E moves into a position whereby the spring contact e—1 engages an insulated portion x—4 of the circuit-breaker, while the spring contact e—3 engages a metal portion u—4. The circuit of the driving motor M is reestablished, this time by the following circuit:

From battery H through wires 101, 120 and 130, spring contact d—2, contact segment u—3, and spring contact d—3 of circuit-breaker D, wire 132, heel o—9 and arm of switch s—5, contact o—7, wire 134, spring contact e—3, contact segment u—4 and spring contact e—2 of circuit-breaker E, wire 135, wire 126 through resistance r, through motor M, thence to battery H.

The motor circuit being thus established, the record will resume its advance until the circuit-breaker D has so far progressed that the insulated portion x—3 comes again to engage spring contact d—3. This breaks the motor circuit. The record and sign display stop again until upon a further actuation of circuit-breaker E, the energizing circuit of the motor is reclosed through contact spring e—1 by means of the circuit previously traced.

The circuit-breakers D and E provide thus in combination for an automatically interrupted advance of the record and thus of the sign display.

In order to check the voltage of the sign system, I employ a voltmeter V and provide therefor a switch s—3 which is brought into engagement with the contact o—13 when the battery H alone supplies the voltage for the system, and which is brought into engagement with the contact o—12 when the booster generator G is also in the circuit.

Lamp filament and relay characteristics

The lamps used in the display panel of the sign may be of standard manufacture, having tungsten filaments, and I take advantage of this fact to obtain a rush of current upon establishing the initiating circuit to effect a quick and certain pick-up of the relay armature. The tungsten filament has the characteristic of having a greatly increased resistance when hot than when cold, and the initial resistance interposed by the lamp in the initiating circuit when the latter is established, is much lower than after the lamp has come up to brilliancy. I take advantage of this fact by proportioning the resistance of the relay coil to make it comparatively small relative to the hot resistance of the lamp filament, and by so doing obtain a rush of current when the initiating circuit is established. Such current rush insures a quick and certain attraction or pick-up of the relay armatures.

Lamp and relay construction

I have provided a novel construction for mounting the lamps and relays, in which I combine each lamp socket and its corresponding relay in a single unitary structure, which can be easily mounted on the display board, and from which the relay can be readily disengaged for replacement or repair. Such a structure is shown in Figs. 21, 21a and 22. In this construction, the display board consists of the metal frame 251 provided with suitable perforations, one for each lamp. Properly secured in these perforations are the lamp sockets. Each socket includes a metal sleeve 253 which is pressed in or spun onto the frame 251 and which projects through the rear side of the display board. The metal sleeve is provided with inside threads which correspond to the threads of the base of the type of lamp to be used. Inserted in the rear end of the sleeve 253, and suitably secured thereto, is a plug 254 of insulating material. A stud or screw 255 passes through this plug and at its ends extends beyond the same.

The relay assembly proper includes a base 260 of insulating material provided with a bore which receives the outer end of the stud 255, and a J-shaped frame 262 of magnetic material is affixed to the top of the plug by means of the screws 261. Attached to the frame 262 by means of a screw 263 is a flanged core 264 of magnetic material which supports and is surrounded by the coil 265 of the relay. Mounted on the lower side of the base 260 and secured thereto by rivets or screws 266 is a spring supported armature 267 provided with a contact 268. The base 260 is removably secured to the plug 254 by means of a screw 269 extending into the base 260 and setting against the stud 255, as shown in Fig. 21a.

In order to interconnect the maintaining circuits of a group of lamps, for instance a horizontal row, to thus control such group by a single maintaining circuit-breaker B, I provide for a common bus bar 270 (see also Fig. 22) which is interposed between the plug 254 and base 260 and is in electrical connection with the armature 267 at 271.

The lead 272 of the relay coil is in electrical connection with the frame 262 of the relay, while the other lead 273 is electrically connected with the screw 269 and stud 255. The center contact 274 of the lamp base contacts with the inner end of the stud 255 while the thread contact 275 electrically engages the sleeves 253 and is as a rule grounded through the frame 251. While I have shown a so-called "miniature" lamp in Figs. 21 and 21a, it should be understood that in using standard sign lamps the same structural features are retained, merely larger lamp sockets being used. In order to inter-relate the showing in Figs. 21–22 with Figs. 1, 2 and 3a, it should be noted that the common lamp return wire 100 is represented in Fig. 21 by the frame 251 which is grounded, and similarly the bus wire 118 and wire 115 are respectively represented by the bus bar 270 and the wire 276 secured by the screw 263 to the relay frame.

From the foregoing it will be observed that I have provided a sign system that is practically universal in its adaptability, in which stationary and moving displays can both be made at the same time or separately, and may be made to move in various directions over the sign, and are under automatic control or manual control or both simultaneously; a system in which the displays of different or similar character may be combined or may be made to follow each other in any desired sequence and at any selected rate, and in which the rate of the light changes may be varied; a system in which the control platens can be used simultaneously and automatically or manually and automatically, or manually as desired, and can be quickly converted without the use of tools from automatic to manual operation and vice versa; in which the platens are so arranged that they can be manipulated by a single operator or by two or more acting in unison or separately as desired; in which the running display and the step by step and the intermittent display are all obtainable automatically in the same system and without the necessity of changes, additions or alterations of parts; in which the lamp brilliancy and voltage regulation are automatically provided for; and one in which comparably large amounts of information at moderate speeds of light changes with standard lamps and without flickering or "tailing" can be obtained, and with substantially uniform use of the lamps in the same.

The foregoing description has been given for purposes of clearness of understanding and illustration of the invention, and no undue limitations should be deduced therefrom but the appended claims should be construed as broadly as permissible in view of the prior art.

Having thus described my invention what I claim and desire to secure by Letters Patent is:—

1. In an electric sign system, the combination of a banked mass of lamps, a stick relay for each lamp, initiating circuits for the lamps in which the relay coils are included in series, maintaining circuits for the lamps and relays, a plurality of sets of control contacts connected in parallel in the initiating circuits, a circuit selecting contactor for each set of contacts connected in parallel in the initiating circuit and adapted to simultaneously select and close the initiating circuits through a plurality of contacts of each set, a constantly operating circuit breaker in a common line of the contactors, and a plurality of constantly operating circuit breakers synchronous with said first circuit breaker, each of said last mentioned circuit breakers being common to a selected group of maintaining circuits.

2. In an electric sign system, the combination of a banked mass of lamps, a stick relay for each lamp, initiating circuits for the lamps and relays, maintaining circuits therefor, a plurality of sets of control contacts in parallel in the initiating circuits, a circuit selecting contactor for each set of contacts in parallel in the initiating circuits, an initiating circuit breaker common to the initiating circuits, a plurality of maintaining circuit breakers each common to a selected group of maintaining circuits, and means for rendering the desired maintaining circuit breakers ineffective without effecting the operation of the remaining circuit breakers.

3. In an electric sign system, the combination of a banked mass of lamps, a stick relay for each lamp, initiating circuits for the lamps and relays, maintaining circuits therefor, a plurality of sets of control contacts in parallel in the initiating circuits, a circuit selecting contactor for each set of contacts in parallel in the initiating circuits, and initiating circuit breaker common to the initiating circuits, a plurality of maintaining circuit breakers each common to a selected group of maintaining circuits, and means for rendering the initiating circuit breaker ineffective without affecting the operation of the maintaining circuit breakers.

4. In an electric sign system, the combination of a banked mass of lamps, stick relays for said lamps initiating circuits and maintaining circuits for such lamps and relays, a plurality of sets of control contacts in parallel in the initiating circuits, a circuit selecting contactor for each set of contacts in parallel in the initiating circuits, a plurality of initiating circuit breakers common to the initiating circuits, means for rendering a desired initiating circuit breaker ineffective, and circuit breakers for the maintaining circuits.

5. In an electric sign system, the combination of massed electric lamps, a stick relay for each lamp, initiating circuits for the lamps and relays, maintaining circuits therefor, control contacts in the initiating circuits, a manually operated circuit selecting contact adapted to be moved about upon the set of control contacts, having thereon a plurality of contactors arranged in the form of the character to be displayed, for simultaneously closing the initiating circuits of a plurality of lamps, a motor operated circuit breaker common to the initiating circuits, and motor-operated circuit breakers synchronous with said first circuit breaker, each of said last-mentioned circuit breakers being common to a group of maintaining circuits.

6. In an electric sign system, the combination of massed electric lamps, a stick relay for each lamp, initiating circuits for the lamps and relays, maintaining circuits therefor, control contacts in the initiating circuits, an articulated manually operated circuit selecting contact adapted to be moved about upon the set of control contacts, having thereon a plurality of contactors arranged in the form of the character to be displayed, for simultaneously closing the initiating circuits of a plurality of lamps, a motor operated circuit breaker common to the initiating circuits, and continuously operating circuit breakers in the initiating and maintaining circuits, said last mentioned circuit breakers being synchronous with said first mentioned circuit breaker.

7. In an electric sign system, the combination of massed lamps, stick relays, one for each lamp, initiating circuits for the lamps and relays, maintaining circuits therefor, a plurality of contact platens of identical construction and each comprising a set of control contacts in parallel in the initiating circuits, a motor, means actuated by the motor for automatically controlling the circuits through one of such sets of control contacts, manual means for simultaneously controlling the circuits through another set of control contacts, a circuit breaker operated by the motor common to the initiating circuits, and a plurality of circuit breakers operated by the motor synchronous with said first circuit breaker, each of said last-mentioned circuit breakers being common to a selected group of maintaining circuits.

8. In an electric sign system, the combination of massed lamps, stick relays, one for each lamp, initiating circuits for the lamps and relays, maintaining circuits therefor, a plurality of sets of control contacts in parallel in the initiating circuits, a motor, means actuated by the motor for automatically controlling the circuits through one of such sets of control contacts, manual means for simultaneously controlling the circuits through another set of control contacts, a circuit breaker operated by the motor common to the initiating circuits, a plurality of circuit breakers operated by the motor synchronous with said first circuit breaker, each of said last-mentioned circuit breakers being common to a selected group of maintaining circuits, and means for rendering selected maintaining circuit breakers inoperative.

9. In an electric sign system, the combination of massed lamps, a stick relay for each lamp, initiating circuits for the lamps and relays, maintaining circuits therefor, a plurality of contact platens of identical construction and each comprising a set of control contacts in parallel in the initiating circuits, a motor, means driven by the motor for automatically controlling the initiating circuits through one set of control contacts, manually operated means for controlling the initiating circuits through another set of control contacts, motor-operated circuit breakers in the initiating and maintaining circuits, said circuit-breakers operating in synchronism, and means for rendering desired circuit breakers inoperative.

10. In an electric sign system, the combination of massed lamps and stick relays therefor, initiating and maintaining circuits for said lamps and relays, a plurality of sets of control contacts in parallel in the initiating circuits, a manually operated contactor removably plugged into a common line of the initiating circuit for controlling the closing of the initiating circuits through one of said sets of contacts, and automatically operated means controlling the closing of the initiating circuits through the contacts of another of said sets of contacts and including a driven record and a removable contact block, such block having contacts co-operating with the record in selecting the circuits through said other set of contacts and also being removably plugged into said common line, said record and contact block being removable to expose said other set of contacts to control by manually operated means.

11. In an electrically operated sign system, the combination with massed lamps and circuits therefor, of a plurality of control platens arranged side by side, each including a set of circuit-controlling contacts, a common line for the circuits, a contactor plugged into such line and having means for co-operating with the contacts of one platen for selecting the circuits through the contacts thereof, a block of contacts removably mounted on another of the platens and adapted to co-operate with means for selecting the circuits through the contacts of said other platen, said block of contacts being plugged into the common line and being bodily removable from said other platen to expose the contacts thereof to control by other means.

12. In an electric sign system for the display on massed electric lamps, of vertically progressing signs under control of a perforated record, a motor for driving the record, a circuit for the motor, a pair of contacts, a rotary circuit breaker actuated by the motor, said circuit breaker having a segment in the motor circuit provided with branches co-operating with the contacts in various positions of the circuit breaker to simultaneously break the motor circuit at one contact and condition the other contact for establishing the motor circuit alternately, and a switch in the motor circuit adapted to be manually operated to complete the motor circuit at the contacts alternately, whereby the motor will operate and the display progress intermittently.

13. In an electric sign system for the display of vertically progressing signs on a massed bank of electric lamps under control of a record, a motor for driving the record, a circuit for the motor, a pair of contacts, a circuit breaker in the motor circuit and actuated by the motor, said circuit breaker having means co-operating with the contacts in various positions of the circuit breaker to simultaneously break the motor circuit at one contact and condition the other contact for establishing the circuit, alternately, and a switch in the motor circuit adapted to complete the motor circuit at the contacts alternately, whereby the motor will operate and display progress intermittently.

14. In an electric sign system for the display of vertically progressing signs on a bank of electric lamps under control of a record, a motor for driving the record a circuit for the motor, a pair of contacts, an automatically operating circuit-breaker, in the motor circuit having means co-operating with the contacts for simultaneously breaking the motor circuit at one contact and conditioning the other contact to establish the motor circuit, alternately, and automatically operating means adapted to complete the motor circuit at the contacts alternately, whereby the motor will operate and the display progress intermittently.

15. In an electrically operated sign system in combination a bank of lamps and circuits therefor, a control platen including a set of circuit controlling contacts, a common line for the circuits, a block of contacts removably mounted on said platen and a circuit selector adapted to be interposed between the platen and the block, said block of contacts being plugged into the common line and bodily removable from said platen to expose the contacts thereof, and a manually operable contactor adapted to be plugged in said common line and to directly contact with the contacts of the platen.

16. In an electrically operated massed lamp sign system as a unitary structure, a control panel having two contact platens removably mounted on said panel and two sub-panels co-operating with said panels and having connecting wires secured thereto for their connection to the lamps, a motor and a rotatable circuit-breaker driven by said motor disposed along a common side of said platens, the axis of said motor and circuit-breaker being parallel with said side of the platens and a record driving mechanism for one of said platens driven by said motor and disposed substantially in axial alignment therewith.

FRANK J. SPRAGUE.